United States Patent
Drachmann

(10) Patent No.: US 10,359,305 B2
(45) Date of Patent: *Jul. 23, 2019

(54) ULTRASONIC FLOW METER WITH A CONNECTION ARRANGEMENT INCLUDING ELASTIC CONNECTORS ARRANGED WITHIN AN INSULATING SUPPORT ARRANGEMENT

(71) Applicant: APATOR MIITORS ApS, Aarhus V (DK)

(72) Inventor: Jens Drachmann, Viby J (DK)

(73) Assignee: Apator Miitors APS (DK)

(*) Notice: Subject to any disclaimer, the term of this patent is extended or adjusted under 35 U.S.C. 154(b) by 197 days.

This patent is subject to a terminal disclaimer.

(21) Appl. No.: 15/383,720

(22) Filed: Dec. 19, 2016

(65) Prior Publication Data

US 2017/0102254 A1    Apr. 13, 2017

Related U.S. Application Data

(63) Continuation of application No. 14/423,231, filed as application No. PCT/DK2013/050272 on Aug. 22, 2013, now Pat. No. 9,557,201.

(30) Foreign Application Priority Data

Aug. 22, 2012    (DK) .................................. 201270496

(51) Int. Cl.
*G01F 1/66* (2006.01)
*H04R 31/00* (2006.01)

(52) U.S. Cl.
CPC .............. *G01F 1/667* (2013.01); *G01F 1/662* (2013.01); *H04R 31/006* (2013.01);
(Continued)

(58) Field of Classification Search
None
See application file for complete search history.

(56) References Cited

U.S. PATENT DOCUMENTS

| 400,331 | A | 3/1889 | Graeser |
| 1,214,425 | A | 1/1917 | Caston |

(Continued)

FOREIGN PATENT DOCUMENTS

| CN | 101153813 A | 4/2008 |
| CN | 201740552 U | 2/2011 |

(Continued)

OTHER PUBLICATIONS

International Search for PCT/DK2013/050272 dated Nov. 28, 2013, 3 pages.
(Continued)

*Primary Examiner* — Harshad R Patel
(74) *Attorney, Agent, or Firm* — Lee & Hayes, P.C.

(57) ABSTRACT

An ultrasonic flow meter includes a meter housing, a first ultrasound transducer, a second ultrasound transducer, an electronic control arrangement for operating the ultrasonic flow meter, and a connection arrangement being arranged between the electronic control arrangement and the ultrasound transducers. The connection arrangement includes an electrically insulating support arrangement, and a set of elastic connectors for electrically connecting the electronic control arrangement with the first and second ultrasound transducers. The insulating support arrangement mechanically fixates the set of elastic connectors and maintains electrical separation between the set of elastic connectors.

25 Claims, 12 Drawing Sheets

Figure 1:
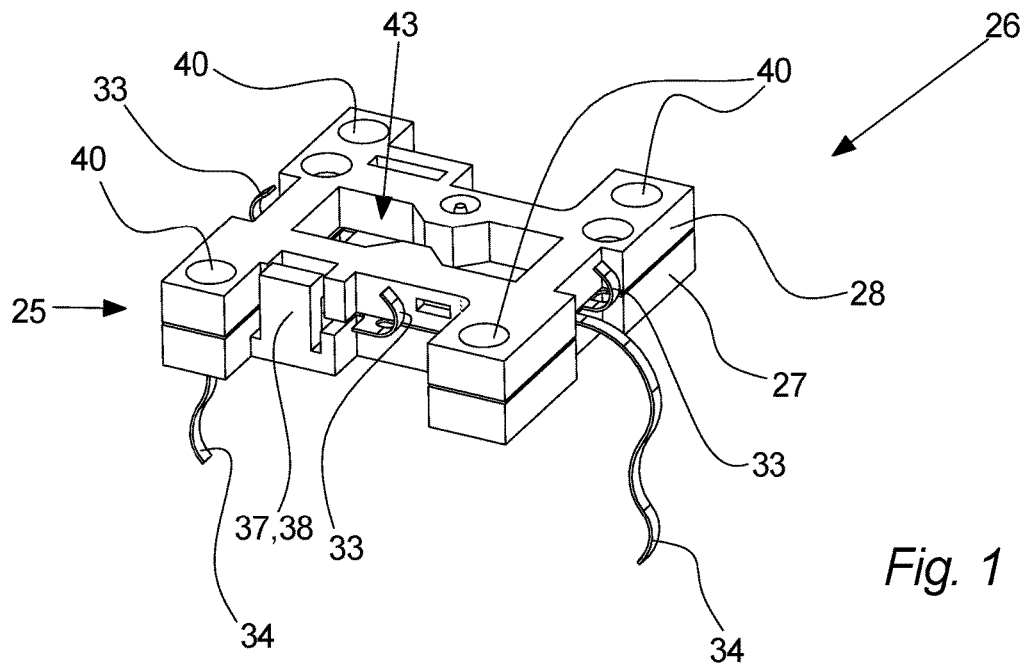

(52) U.S. Cl.
CPC .... *Y10T 29/49005* (2015.01); *Y10T 29/49169* (2015.01); *Y10T 29/49217* (2015.01)

(56) References Cited

U.S. PATENT DOCUMENTS

| | | | |
|---|---|---|---|
| 1,473,751 A | 11/1923 | Walker | |
| 3,237,453 A | 3/1966 | Yamamoto et al. | |
| 3,741,014 A | 6/1973 | Tamura | |
| 3,906,791 A | 9/1975 | Lynnworth | |
| 4,195,517 A | 4/1980 | Kalinoski et al. | |
| 4,221,128 A | 9/1980 | Lawson et al. | |
| 4,227,407 A | 10/1980 | Drost | |
| 4,297,607 A | 10/1981 | Lynnworth et al. | |
| 4,335,617 A | 6/1982 | Ashmore et al. | |
| 4,475,054 A | 10/1984 | Baumoel | |
| 4,555,951 A | 12/1985 | Gutterman | |
| 4,631,965 A | 12/1986 | De Vadder et al. | |
| 4,754,650 A | 7/1988 | Smalling et al. | |
| 4,787,252 A | 11/1988 | Jacobson et al. | |
| 4,930,358 A | 6/1990 | Motegi et al. | |
| 5,090,252 A | 2/1992 | Tschirner | |
| 5,179,862 A | 1/1993 | Lynnworth | |
| 5,251,490 A | 10/1993 | Kronberg | |
| 5,351,560 A | 10/1994 | Russwurm | |
| 5,372,047 A | 12/1994 | Russwurm et al. | |
| 5,753,824 A | 5/1998 | Fletcher-Haynes | |
| 5,831,175 A | 11/1998 | Fletcher-Haynes | |
| 6,508,134 B1 | 1/2003 | Feller | |
| 6,739,203 B1 * | 5/2004 | Feldman | G01F 1/662 73/861.27 |
| 6,901,812 B2 | 6/2005 | Moscaritolo et al. | |
| 8,893,559 B2 | 11/2014 | Drachmann | |
| 8,904,881 B2 * | 12/2014 | Sonnenberg | G01F 1/662 73/861.27 |
| 9,557,201 B2 * | 1/2017 | Drachmann | G01F 1/662 |
| 9,568,347 B2 | 2/2017 | Drachmann | |
| 2001/0015107 A1 | 8/2001 | Feller | |
| 2004/0123674 A1 | 7/2004 | Moscaritolo et al. | |
| 2006/0156827 A1 | 7/2006 | Lang et al. | |
| 2006/0288798 A1 | 12/2006 | Kroemer et al. | |
| 2007/0186681 A1 | 8/2007 | Shkarlet et al. | |
| 2007/0261501 A1 | 11/2007 | Lang | |
| 2008/0271543 A1 | 11/2008 | Hecht et al. | |
| 2009/0178490 A1 | 7/2009 | Konzelmann et al. | |
| 2011/0079090 A1 | 4/2011 | Kroemer et al. | |
| 2011/0271769 A1 | 11/2011 | Kippersund et al. | |
| 2011/0277557 A1 | 11/2011 | Kroemer et al. | |
| 2012/0006127 A1 | 1/2012 | Nielsen | |
| 2012/0203097 A1 | 8/2012 | Nieminen | |
| 2012/0227473 A1 | 9/2012 | Sinha | |
| 2012/0266691 A1 | 10/2012 | Satou et al. | |
| 2012/0272749 A1 | 11/2012 | Lang | |
| 2012/0272750 A1 | 11/2012 | Fujii et al. | |
| 2012/0285260 A1 | 11/2012 | Mueller et al. | |
| 2012/0318069 A1 | 12/2012 | Murakami | |
| 2013/0031988 A1 | 2/2013 | Drachmann | |
| 2013/0047743 A1 | 2/2013 | Sonnenberg et al. | |
| 2013/0312537 A1 | 11/2013 | Miyata et al. | |
| 2014/0318268 A1 | 10/2014 | Sorensen et al. | |
| 2017/0122786 A1 | 5/2017 | Kroemer et al. | |
| 2017/0219400 A1 | 8/2017 | Umezawa et al. | |

FOREIGN PATENT DOCUMENTS

| | | |
|---|---|---|
| DE | 102006023479 A1 | 11/2007 |
| DK | 177040 B1 | 2/2011 |
| EP | 0440867 A1 | 8/1991 |
| EP | 0813041 A1 | 12/1997 |
| EP | 1435511 A2 | 7/2004 |
| EP | 1493998 A2 | 1/2005 |
| EP | 1798528 A1 | 6/2007 |
| EP | 1983311 A2 | 10/2008 |
| EP | 2083250 A1 | 7/2009 |
| EP | 2083251 A1 | 7/2009 |
| EP | 2562517 A1 | 2/2013 |
| JP | H0688738 A | 3/1994 |
| JP | H08178942 A | 7/1996 |
| UA | 69589 A | 9/2004 |
| WO | 2007020375 A1 | 2/2007 |
| WO | 2008053193 A1 | 5/2008 |
| WO | 2010112029 A1 | 10/2010 |
| WO | 2011127934 A1 | 10/2011 |
| WO | 2011141167 A2 | 11/2011 |
| WO | 2012113401 A1 | 8/2012 |

OTHER PUBLICATIONS

Danish Search Report from Danish Patent Application No. PA 2012/70496, dated Feb. 18, 2013, 2 pages.

* cited by examiner

ULTRASONIC FLOW METER WITH A CONNECTION ARRANGEMENT INCLUDING ELASTIC CONNECTORS ARRANGED WITHIN AN INSULATING SUPPORT ARRANGEMENT

FIELD OF THE INVENTION

The invention relates to an ultrasonic flow meter for measuring the flow of a fluid.

BACKGROUND OF THE INVENTION

Several ultrasonic flow meters exists within the prior art.

One example of an ultrasonic flow meter is seen in the international patent application WO 2012/113401. According to this prior art, the ultrasonic flow meter comprises two transducers electrically connected to an electronic circuit. One side of each transducer is connected to the electronic circuit, via a spring, while the opposite sides are connected to each other via coupling layers and conductive layers, one of these conductive layers being connected to the electronic circuit by a spring.

There may, however, in some cases exist problems with the solution of the above mentioned prior art in relation to electrically connecting ultrasound transducers with an electric circuit.

SUMMARY OF THE INVENTION

It may be an object of the invention to provide a compact ultrasonic flow meter.

It may be a further object of the invention to provide an efficient and cost-effective ultrasonic flow meter and a method for assembling such an ultrasonic flow meter.

It may be a further object of the invention to solve problems in relation to prior art.

One further object of the invention may be to provide electrical connection between ultrasonic transducers and an electronic control arrangement.

The invention relates to an ultrasonic flow meter comprising
- a meter housing,
- a first ultrasound transducer,
- a second ultrasound transducer,
- an electronic control arrangement for operating said ultrasonic flow meter, and
- a connection arrangement being arranged between said electronic control arrangement and said ultrasound transducers,
- said connection arrangement comprising
- an electrically insulating support arrangement, and
- a set of elastic connectors for electrically connecting said electronic control arrangement with said first and second ultrasound transducers,
- said insulating support arrangement mechanically fixating said set of elastic connectors and maintaining electrical separation between said set of elastic connectors.

In the present context in should be understood that an ultrasonic flow meter may typically comprise further parts, such as e.g. a flow tube defining an inner flow channel for a fluid to be measured. Other further typical, but optional components may e.g. comprise one or more batteries, and/or one or more displays.

One advantage of the invention may be that the assembly of the ultrasonic flow meter may be relatively simple and/or fast while maintaining effective and enduring electrical connections between the electronic control arrangement and the first and second ultrasound transducers. E.g. the assembly may, according to one embodiment, be effected by providing the meter housing, inserting the transducers into this meter housing, then inserting the connection arrangement, and, finally, introducing the electronic control arrangement into the meter housing. By means of such a few-step assembly, effective electrical connection from the electronic control arrangement, through the connection arrangement, to the transducers may be established. The electrical connection may be very enduring, in the sense that these electrical connections may retain sufficient electrical connectivity over a relatively long time period, such as the lifetime of the ultrasonic flow meter.

One important advantage of the invention may be that the connection arrangement may be provided as a single separate unit thereby making the assembly of the ultrasonic meter relatively simple and fast. While some other solutions may possibly provide separate connections from each transducer or transducer contact to the electronic control arrangement, the connections, established by the connection arrangement of the present invention, are provided in a single unit, which may preferably, according to one embodiment, be preassembled prior to insertion into the meter.

It should be noted that the term electronic control arrangement is to be understood as the control arrangement operating the meter, this control arrangement typically comprising one or more printed circuit board (PCB), electronic components, electronic circuits etc. Therefore, the electronic control arrangement may sometimes be referred to simply as an electronic circuit. The electronic control arrangement are thereby adapted to control the voltage applied to the transducer, i.e. control the emission ultrasound by the transducers, and also adapted to receive an electronic signal from a transducer representative of an ultrasound signal received by said transducer, i.e. the electronic control arrangement receive and store measured signals from the transducers.

One particular advantage of the invention may be that the all elastic connectors necessary for establishing electrical connection between the electrical control arrangement controlling the ultrasonic flow meter and said first and second ultrasound transducers is provided by said connection arrangement. By having a single connection arrangement providing mechanically connected but electrically insulated elastic connectors, the assembly of the ultrasonic meter may be particularly simple. First, since only a single connection arrangement is to be provided and, furthermore, since such connection arrangement has three contact points with said ultrasound transducers and/or their contacts, problems connected with balancing individual elastic connectors or fixating such individual connectors, e.g. during assembly of the flow meter, may be eliminated, thereby providing a more simple and faster assembly of the ultrasonic flow meter.

After the connection arrangement, which may optionally, according to an embodiment, be fixated to the transducers by e.g. conducting adhesive, is inserted into the meter housing, the electronic circuit may simply be inserted on top of the connection arrangement, and optionally, according to an embodiment, be fixated to the connection arrangement by e.g. soldering. Thereby, the assembly, after insertion of the transducers, until contact between the electronic circuit and the transducers is established, may simply be done in two steps.

It should be noted, that ultrasound transducers may often, according to many embodiments, comprise a piezoelectric disc or simply be a piezoelectric disc with electrodes or contacts emitting ultrasound when a certain voltage signal is applied between the contacts. Therefore, the term ultrasound transducer may in some embodiments refer to a piezoelectric disc adapted for transmitting ultrasound, and, possibly comprising contacts.

It is to be understood that contacts of said ultrasound transducer are terminals, which may be electrically connected to said electronic control arrangement so as to allow said electronic control arrangement to control and/or read measure a voltage between the contacts of each transducer.

According to an embodiment, the connection between said connection arrangement and said ultrasounds transducers is substantially free of adhesive. Thereby, the connection arrangement and the ultrasound transducers remains mechanically separated units, even after assembly of the meter, the elastic connectors maintaining the electrical connection to the transducers without being fixated to said transducers by e.g. adhesives, soldering etc., but by means of an elastic force, such e.g. a spring force for connectors comprising one or more springs. One advantage of this embodiment may be that a more stable connection, especially over very long time periods, such as many years, may be obtained. While mechanical forces may affect and wear adhesive or soldering based connections, a connection based on an elastic force may remain relatively unaffected by mechanical forces induced, e.g. by movement of the connection arrangement etc.

According to an embodiment, the connection between said connection arrangement and said electronic control arrangement is substantially free of soldering. Thereby, the connection arrangement and the electronic control arrangement remains mechanically separated units, even after assembly of the meter, the elastic connectors maintaining the electrical connection to the electronic control arrangement without being fixated to said electronic control arrangement by e.g. adhesives, soldering etc., but by means of an elastic force, such e.g. a spring force for connectors comprising one or more springs. One advantage of this embodiment may be that a more stable connection, especially over very long time periods, such as many years, may be obtained. While mechanical forces may affect and wear adhesive or soldering based connections, a connection based on an elastic force may remain relatively unaffected by mechanical forces induced, e.g. by movement of the connection arrangement etc.

According to an embodiment, the ultrasonic flow meter is adapted to measure the average flow velocity of the fluid. This may e.g. be done by said first ultrasound transducer emitting a first ultrasound pulse. The first transducer is positioned such that the first ultrasound pulse is incident on a first ultrasound reflector, which optionally reflects the first ultrasound pulse towards further ultrasound reflectors or towards the second ultrasound transducer, which then receives or detects the first ultrasound pulse. Thereby, a first path from the first ultrasound transducer, via the first ultrasound reflector and optionally one or more additional ultrasound reflectors, and onto the second ultrasound transducer is defined. Similarly, the second ultrasound pulse may be sent from the second ultrasound transducer, via the one or more ultrasound reflectors and onto the first ultrasound transducer, thereby defining a second path, equal to said first path, except opposite in direction. By measuring a first transit time as the time between emitting and detecting the first ultrasound pulse, and a second transit time as the time between emitting and detecting the second ultrasound pulse, the mean velocity of the fluid can be calculated from the two transit times and the geometry of the transducers and reflectors.

In is to be understood that said one or more ultrasound reflector are adapted to reflect the ultrasound, thereby redirecting the path of the ultrasound beam from one ultrasound transducer to the other ultrasound transducer.

According to an embodiment of the invention, the ultrasonic flow meter is adapted for measuring a flow velocity of a fluid flowing through the flow channel. This fluid may be liquids as well as gasses, particularly liquids, such as water.

It should be noted in connection with the present invention that an elastic connector is to be understood as a connector having elastic properties, due to shape and/or material, i.e. a connector, which is capable of recovering an initial state, such as size and/or shape, after deformation. Preferably, according to an embodiment, said elastic connector may comprise one or more springs.

According to an embodiment of the invention, said ultrasonic flow meter is a utility meter.

According to an embodiment of the invention, the ultrasonic flow meter is adapted to measure the consumption of fluids, such as liquids, such as water, hereunder water for heating, cooling, and/or tap water, and/or gasses.

According to an embodiment of the invention, said first and second ultrasound transducers are connected to a common contact.

One significant advantage of the above embodiment may be that a connection arrangement with only three connectors may enable an electronic control arrangement to control the ultrasound transducers and/or read out electronic signals from the ultrasound transducers. Furthermore, such a common contact may enable a more convenient way of connecting said connection arrangement with that contact of the ultrasound transducers, which faces away from the electronic control arrangement.

According to an embodiment of the invention, said common contact comprises a metal layer. Said metal layer may be applied to the meter housing, and the transducers positioned, at least partly, on top of this metal layer, such that the metal layer has an area free of contact with the transducer. This free area may then be in contact with one of said elastic conductors so as to establish electrical contact between said electronic control arrangement and said common contact, and thereby to the transducers.

According to an embodiment of the invention, said common contact is a metal layer. Said metal layer may be applied to the meter housing, and the transducers positioned, at least partly, on top of this metal layer such that the metal layer has an area free of contact with the transducer. This free area may then be in contact with one of said elastic conductors so as to establish electrical contact between said electronic control arrangement and said common contact, and thereby to the transducers.

According to an embodiment of the invention, said ultrasound transducers are connected to said common contact via an intermediate layer, such as a conductive adhesive.

According to an embodiment of the invention, each elastic connector comprises a first spring part for engaging said electronic control arrangement and a second spring part for engaging said first and/or second transducer.

In the present context it should be understood that by said second spring part engaging said first and/or second transducer may be meant that said second spring part directly engages said transducer, e.g. by engaging a contact positioned on said transducer, or that it indirectly engages said transducer, e.g. by engaging a contact positioned external from said transducer. In one advantageous embodiment, the first and second connectors each engages a first contact of said first and second transducer, respectively, while a third connector engages a common second contact of said first and said second transducer.

According to an embodiment of the invention, each elastic connector comprises a first spring part for engaging said electronic control arrangement, a second spring part for engaging said first and/or second transducer, and a flat fastening part for fixating to said insulating support arraignment.

By engaging a transducer may often be meant engaging a contact of that transducer.

According to and embodiment, said first and second spring part are separated by a plane defined by said flat fastening part. Thereby, said first spring part is positioned on one side of said plane defined by said flat fastening part, while said second spring part is positioned on the opposite side of said plane defined by said flat fastening part.

According to an embodiment of the invention, said flat fastening part comprises one or more through-holes engaged by a connection part of said insulating support arrangement.

According to an embodiment of the invention, said flat fastening part comprises one or more through-holes engaged one or more pins of said first and second insulating parts, said first and second insulating parts thereby fixating said flat fastening part between each other.

According to an embodiment of the invention, said first and second ultrasound transducers each comprises a first contact for engaging a second spring part and a second contact for engaging another second spring part, and for each ultrasound transducer said first contact and said second contact are positioned on opposite sides of said ultrasound transducer.

Thereby, according to an embodiment of the invention, said first contact extends over a part of one side of said transducers, and preferably does not extend onto other sides of said transducer. This is preferably also applies to said second contact. Thereby, it is possible to use substantially the whole of the area of the transducer as an effective ultrasound emission area. This, in turn, allows for a smaller transducer, and again for a smaller transducer recess. Since the transducer recess may typically extend at least partly into the flow chamber and thereby being in contact with the fluid, the fluid in the chamber may therefore exert a pressure on the transducer recess. Therefore, the dimensioning of the transducer housing, the locking pins, the flow tuber, and/or other parts of the ultrasonic flow meter must typically be adjusted to withstand such a pressure. However, when the size of the transducer and thereby the transducer recess may be lowered, the effective area of the transducer recess being in contact with the fluid may be lowered, thereby lowering the pressure exerted on the transducer recess by the fluid, finally relaxing the dimensioning requirements.

According to an embodiment of the invention, said insulating support arrangement is arranged with a distance from said electronic control arrangement and with a distance from said ultrasound transducers.

One advantage of the above embodiment may be that in such embodiments, the connection arrangements may be particularly advantageous.

According to an embodiment of the invention, said insulating support arrangement comprises
  a first insulating part, and
  a second insulating part,
  wherein said set of elastic connectors is fixated between said first and second insulating parts.

One advantage of the above embodiment may be that the assembly of the insulating support arrangement and, thereby, of the connection arrangement may be particularly fast and/or easy. Furthermore, by fixating said set of connectors between the insulating parts, the set of connectors can be handled mechanically as one unit or piece, while maintaining electrical insulation between the individual connectors. Thereby, the set of connectors are mechanically supported in a common unit while electrically insulated.

According to an embodiment of the invention, said first and second insulating parts are substantially identical.

One advantage of the above embodiment may be that the assembly of the insulating support arrangement and thereby of the connection arrangement may be particularly fast and/or easy. Another particular advantage may be that only one type of insulating part has to be manufactured. This may typically be a rather significant advantage, as only one type of production equipment, e.g. one type of mold has to be used, only one type of quality control, etc.

According to an embodiment of the invention, said first and second insulating parts are locked together by a latch-notch mechanism.

One advantage of the above embodiment may be that the assembly of the insulating support arrangement, and, thereby, of the connection arrangement, may be particularly fast and/or easy.

According to an embodiment of the invention, said first and second insulating parts each comprise a latch and a notch, each latch being adapted for engaging the notch on the opposite insulating part.

One advantage of the above embodiment may be that the assembly of the insulating support arrangement is relatively simple and/or fast. Furthermore, by using a latch and notch connection, a relatively rigid and stable fixation between the two insulating parts may be achieved while at least in some embodiments, this may fixation may be released, i.e. the latch and notch may be disengaged from each other.

According to an embodiment of the invention, said insulating support arrangement comprises one or more recesses and/or holes for being engaged by pins connected to said meter housing.

One advantage of the above embodiment may be that the position of the connection arrangement relative to the meter housing may be fixated, at least with respect to some directions. Particularly, according to an embodiment, it may be preferred that the pins are oriented such that they have a longitudinal direction orthogonal to a plane defined by the electronic control arrangement, or, alternatively defined, in the direction from the flow tube towards the electronic control arrangement, thereby allowing easy engagement of the pins and recesses, and, furthermore, that connection arrangement is fixated in the transverse plane of the meter housing, such a transverse plane being defined as transverse to a direction from the flow tube towards the electronic control arrangement. As the connection arrangement may typically be fixated between the transducers and/or their contacts and the electronic control arrangement in the direction defined as the direction from the flow tube towards the electronic control arrangement, by establishing addition fixation in the transverse plane, the connection arrangement becomes completely fixated and thereby relatively insensitive to e.g. vibrations or repeated shaking or turning during e.g. transportation and/or installation.

According to an embodiment of the invention, each of said elastic connectors comprises a flat fastening part, said flat fastening part comprising one of more through-holes being engaged by pins of said first and/or second insulating parts.

One advantage of the above embodiment may be that each of the connectors is effectively fixated in a relatively simple manner, thereby enabling easy and fast assembly. It is to be understood that said pins of said first and/or second insulating parts engage said through-holes of said fastening parts and then recesses, such as through-holes, of the opposite of said insulating parts.

According to an embodiment of the invention, said flat fastening part is arranged between a first and a second spring part. Preferably, according to an embodiment, after assembly of said meter, one side of said flat fastening part faces said electronic control arrangement, while the opposite side of said flat fastening part faces said first and second ultrasound transducer.

According to an embodiment of the invention, said set of elastic connectors consists of three elastic connectors.

One advantage of the above embodiment may be that said connection arrangement may be relatively easy, fast and/or cheap to manufacture. When connecting two different ultrasound transducers to an electrical control arrangement, each transducer having two electrical contacts, one would usually use a total of four connectors. However, it has been realized that by using one common contact shared between the two ultrasound transducers, only three connectors are needed, while maintaining individual control and/or read-out capability over the two ultrasound transducers. E.g. this shared contact may be a zero-contact, i.e. zero voltage is applied by said electronic control arrangement to this shared contact while the voltage applied by said means of the other two connectors may be individually controlled and/or read-out by said electronic control arrangement, e.g. to control the voltage applied to the first transducer so as to transmit an ultrasound signal by from said first transducer and subsequently receive a voltage from generated by said second transducer as response to receiving said ultrasound signal transmitted by said first transducer. I.e. the above described capabilities of said electronic control arrangement controlling and receiving a voltage from said transducers may be maintained with said set consisting of three elastic connectors.

According to an alternative embodiment, said set of elastic connectors comprises at least four elastic connectors.

According to an embodiment of the invention, said first and second transducers are orientated with an angle with respect the longitudinal direction of said flow channel.

One advantage of the above embodiment may be that the flow meter may be particularly accurate and/or have low power consumption. When using angled transducers, the path of the ultrasound from said first transducer to said second transducer, or vice versa, may be designed such that all components of the path contribute to the measurement of the fluid flow, i.e. that all path has a non-zero component parallel to the longitudinal axis of the flow tube. This may be done without increased power consumption, which may be a particular advantage in many ultrasonic flow meters, which are battery powered. Furthermore, the above mentioned advantages may be obtained with a relatively compact flow meter that, therefore, may have versatile possibilities for simple installation in narrow spaces. Such angled transducers may often be hard to implement in ultrasonic flow meters. However, by means of the connection arrangement of the above embodiment, the implementation of angled transduces may be realized in a relatively simple, yet advantageous manner.

According to an embodiment of the invention, said first ultrasound transducer is positioned in a first transducer recess of said meter housing, a second ultrasound transducer positioned in said second transducer recess of said meter housing, said transducer recesses each having slanted bottom walls, and said first and second ultrasound transducers being in abutment with said slanted bottom walls of said first and second transducer recess, respectively.

In the present context of the above embodiment, it is to be understood that said first ultrasound transducer is in abutment with said slanted bottom wall of said first transducer recess and that said second ultrasound transducer is in abutment with said slanted bottom wall of said second transducer recess.

According to an embodiment of the invention, each of said elastic connectors comprises metal strips or pins.

One advantage of the above embodiment may be that electrical connectors comprising metal strips or pins may be relatively easy to manufacture, e.g. by punching out each connector in one piece from a metal sheet, or even the whole set of connectors in a single piece from a metal sheet. Typically, it should be understood that the first and/or second spring parts may be or at least comprise such metal strips or pins.

According to an embodiment of the invention, each of said elastic connectors comprises curved metal strips.

One advantage of the above embodiment may be that electrical connectors comprising metal strips may be relatively easy to manufacture, e.g. by punching out each connector in one piece from a metal sheet, or even the whole set of connectors in a single piece from a metal sheet. Typically, it should be understood that the first and/or second spring parts may be or at least comprise such metal strips.

According to an embodiment of the invention, said set of elastic connectors are made from the same prefabricated metal punch-out sheet.

One substantial advantage of the above embodiment may be that the assembly of the connection arrangement may be quite simple and fast. Typically, if separate connectors are handled, this separate handling takes longer time and is more cumbersome. Additionally, for smaller parts it may often apply that the inconvenience related to handling a certain part is inversely proportional to its size. Therefore, when punching out the entire set of connectors from one metal sheet the above mentioned advantages may be obtained, especially in an embodiment, where the punched out set of connectors are fixated between a first and a second insulating part before separating the individual elastic connectors from each other.

According to an embodiment of the invention, said first and/or second insulating parts comprise one or more openings allowing said elastic connectors to be separated during assembly of the connection arrangement.

One advantage of the above embodiment may be that assembly of said connection arrangement may be fast and/or simple. Particularly, by allowing said set of elastic connectors to be fixated between said first and second insulating parts during assembly as a single part, i.e. before separation into separate connectors, the handling of this set of connectors may be relatively easy, even compared to a single individual connector due to easier handling for larger sizes. This, however, may require that the set of elastic connectors may be effectively separated after assembly so as to establish and maintain electrical insulation between said individual connectors. By employing one or more openings in said first and/or second insulating parts, this separation of connectors may be carried out relatively simple.

Preferably, said first and second insulating parts may both comprise one or more openings allowing said elastic connectors to be separated during assembly of the connection arrangement.

According to an embodiment of the invention, said elastic connectors comprises a beryllium copper alloy, a phosphor bronze alloy, copper, nickel brass (also known as German silver), brass, or a combination thereof.

One advantage of the above embodiment may be that beryllium copper alloy, a phosphor bronze alloy, copper, a zinc alloy, or a combination thereof may have excellent characteristics as a conductor, thereby effectively establishing electrical connection between said electronic control arrangement and said ultrasound transducers while also having advantageous characteristics for an elastic component, such as a spring, thereby facilitating the mechanical contact necessary to establish electrical connection.

According to an embodiment said connectors consists of a beryllium copper alloy, a phosphor bronze alloy, copper, nickel brass (also known as German silver), brass, or a combination thereof.

It should of course be understood that in alternative embodiments other materials may be used for the conductors, such materials having satisfactory electrical conductivity and elastic properties, and possibly other properties suitable for elastic connectors.

According to an embodiment of the invention, said electronic control arrangement applies a force on said connection arrangement in a direction towards the flow tube, and said first and second transducers applies a force on said connection arrangement in a direction away from said flow tube towards said electronic control arrangement.

One advantage of the above embodiment may be that the connection arrangement is fixated between the transducers and the electronic control arrangement. In this context it should be understood that transducers may typically be arrangement with a contact part for being in abutment with the second spring parts of the connection arrangement. Another advantage may be that electrical connection between the transducers and the connection arrangement and between the electronic control arrangement and the connection arrangement may be established and maintained due to these forces applied. Although it may in some cases be possible to establish such forces without the use of springs, these forces may often be increased substantially with the use of springs, without compromising durability.

According to an embodiment of the invention, said ultrasonic flow meter furthermore comprises at least one ultrasound reflector.

According to a preferred embodiment, said ultrasonic flow meter comprises three ultrasound reflectors adapted for subsequently reflecting an ultrasound signal emitted from the first transducer onto the second transducer, or vice versa.

According to an embodiment of the invention, said ultrasonic flow meter furthermore comprises at least one battery for powering said ultrasonic flow meter.

According to an embodiment of the invention, said first and second spring parts may be elastic legs. Such elastic legs may be e.g. metal strips, i.e. elongated metal legs with a flat substantially rectangular cross-section. Furthermore, it may be preferred that the metal strips are curved in order to increase the elasticity, i.e. to obtain a relatively effective spring. Such rectangular cross-sectioned springs may typically have elasticity with respect to movement in one transversal direction which is relatively high compared to movement in a second transversal direction perpendicular to the first direction.

According to an embodiment of the invention, said insulating support arrangement comprises an insulating plastic material.

Advantageously, the insulating support arrangement may be made of an insulating plastic material. Typically, if the insulating support arrangement comprises two possibly identical insulating parts, these parts are made of an insulating plastic material, e.g. by injection molding.

The invention furthermore relates to a method for assembling an ultrasonic flow meter, said ultrasonic flow meter comprising
  a meter housing,
  a first ultrasound transducer,
  a second ultrasound transducer,
  an electronic control arrangement for operating said ultrasonic flow meter, and
  a connection arrangement being arranged between said electronic control arrangement and said ultrasound transducers,
  said connection arrangement comprising
  an electrically insulating support arrangement, and
  a set of elastic connectors for electrically connecting said electronic control arrangement with said first and second ultrasound transducers,
  said insulating support arrangement mechanically fixating said set of elastic connectors and maintaining electrical separation between said set of elastic connectors, wherein said method comprises the steps of
  providing said meter housing,
  inserting said first and second ultrasound transducer into said meter housing,
  inserting said connection arrangement into said meter housing so as to establish electrical contact to said first and second transducers, and
  inserting said electronic control arrangement so as to establish electrical contact to said first and second transducers.

The assembly of an ultrasonic flow meter according to the invention may have the advantages that the assembly may be easy and/or that it may be carried out fast.

According to an embodiment of the invention, said method furthermore comprises a step of assembling said connection arrangement by
  punching out of a flat metal sheet said set of elastic connectors as a single piece,
  fixating said set of elastic connectors as a single piece between a first and second insulating part,
  separating said set of elastic connectors to establish electrical insulation between the elastic connectors fixated between said first and second insulating parts, and
  bending first and second spring parts of said elastic connectors to allow engagement of said electronic control arrangement and said first and second transducers.

One advantage of said connection arrangement may be that it may be used in an advantageous way to connect an electronic control arrangement to one or more ultrasound transducers in an ultrasonic flow meter.

According to an embodiment of the invention, said method of assembling an ultrasonic flow meter may be used to assemble an ultrasonic flow meter according to any embodiment of the invention.

The invention furthermore relates to a method of manufacturing a connection arrangement, said method comprises the steps of punching out of a flat metal sheet said set of elastic connectors as a single piece, fixating said set of elastic connectors as a single piece between a first and second insulating part, separating said set of elastic connectors to establish electrical insulation between the elastic connectors fixated between said first and second insulating parts, and bending first and second spring parts of said elastic connectors to allow engagement of said electronic control arrangement and said first and second transducers.

One advantage of the above mentioned method of the invention may be that a connection arrangement may be manufactured faster and/or easier. Furthermore, a connection arrangement manufactured according to the above mentioned method may be advantageous over alternative connection arrangements, e.g. due to it being one mechanically connected unit due to said first and second insulating parts.

According to an embodiment of the invention, said connection arrangement manufactured in accordance with said method of manufacturing a connection arrangement may be used in an ultrasonic flow meter according to any embodiment of the invention.

It may be an object of the invention to provide a compact ultrasonic flow meter.

It may be a further object of the invention to provide an efficient and cost-effective ultrasonic flow meter and a method for assembling such an ultrasonic flow meter.

The invention furthermore relates to an ultrasonic flow meter comprising a meter housing, a flow tube defining an inner flow channel for a fluid to be measured, and one or more ultrasound reflectors, said meter housing comprising a first transducer recess, a second transducer recess, a first ultrasound transducer positioned in said first transducer recess, a second ultrasound transducer positioned in said second transducer recess, and an electronic circuit for operating said ultrasonic flow meter, wherein said transducer recesses each has slanted bottom walls, and wherein said first and second ultrasound transducers are in abutment with said slanted bottom walls of said first and second transducer recess, respectively.

In the present context it is to be understood that said first ultrasound transducer is in abutment with said slanted bottom wall of said first transducer recess and that said second ultrasound transducer is in abutment with said slanted bottom wall of said second transducer recess.

The ultrasonic flow meter is adapted to measure the average flow velocity of the fluid. This may preferably be done by said first ultrasound transducer emitting a first ultrasound pulse. The first transducer is positioned such that the first ultrasound pulse is incident on the first ultrasound reflector, which reflects the first ultrasound pulse towards the second ultrasound transducer, which then receives or detects the first ultrasound pulse. Thereby, a first path from the first ultrasound transducer, via the first ultrasound reflector, and onto the second ultrasound reflector is defined. Similarly, the second ultrasound pulse is sent from the second ultrasound transducer, via the first ultrasound reflector and onto the first ultrasound reflector, thereby defining a second path. By measuring a first transit time as the time between emitting and detecting the first ultrasound pulse, and a second transit time as the time between emitting and detecting the second ultrasound pulse, the mean velocity of the fluid can be calculated from the two transit times and the geometry of the transducers and reflectors.

Said first ultrasound reflector is adapted to reflect the ultrasound, thereby redirecting the path of the ultrasound beam from one ultrasound transducer to the other ultrasound transducer.

When said transducer recesses extend into the flow tube, a particular advantage of the invention is achieved. This is that due the ultrasound transducers being slanted relative to the transducer recesses, these ultrasound recesses can be constructed with a smaller diameter or cross-sectional area, whereby the tube openings can be made with a smaller diameter or area. Since these areas are reduced, the pressure exerted by the fluid in the flow channel upon the transducer recesses extending into the flow channel can be reduced. This results in reduced the minimum limits on material strength and on the construction design, which are a result of this fluid pressure. A result from these reduces limitations is that a more compact flow meter may be constructed, due to e.g. reduced need for connection strength between the meter housing and the flow tube.

Another advantage of the invention is that the meter housing including its components may be assembled as a single mechanical unit. Thereby, the ultrasonic flow meter may be produced and assembled in a simple and cost-effective way.

Yet another advantage of the invention is that since the ultrasound transducers have a slanted orientation, flow tubes of different diameters may be fitted to the same meter housing. Only the position and/or the orientation of the one or more ultrasound reflectors have to be changed. Preferably, the ultrasound reflectors may be fixated by a flow channel insert. Thereby, for each flow tube with different diameters, a flow channel insert may be constructed that fits the particular tube, and which furthermore includes ultrasound reflectors in the adjusted positions and orientations so that an ultrasound signal reflected by the first ultrasound transducer propagates via the ultrasound reflectors to the second ultrasound transducer. Since the meter housing may typically represent the main expenses of the tools for production of the ultrasonic flow meter it may be expensive to produce different meter housings for each flow tube diameter. However, since a meter housing may be fitted to flow tubes of different diameters, this extra cost may be avoided or reduced.

One particular aspect of the invention is that the first and second transducers are both placed inside and as a part of the meter housing. Thereby, it is to be understood that an ultrasound signal emitted by the first ultrasound transducer, and reflected by the one or more ultrasound reflectors, before being detected by the second transducer, will propagate from the emitting surface of the first transducer through the slanted bottom wall of the e first transducer recess, through the fluid in the flow channel, reflected by the one or more ultrasound reflectors while still propagating through the fluid, and through the slanted bottom wall of the second transducer recess, before finally reaching the transmitting surface of the second ultrasound transducer where the ultrasound signal is detected and transformed into an electrical signal by the second transducer.

According to an embodiment of the invention, it is to be understood that a transducer recess is a local extension of the inner space of the meter housing, in which an ultrasound transducer may be positioned. Thereby, the ultrasound transducer can emit an ultrasound signal through the slanted bottom wall of the transducer recess and into the flow channel of the ultrasonic flow meter, and vice versa receive an ultrasound signal through propagating through said slanted bottom wall of said transducer recess.

According to an embodiment of the invention, the ultrasonic flow meter is adapted for measuring a flow velocity of a fluid flowing through the flow channel. This fluid may be liquids as well as gasses, particularly liquids such as water.

According to an embodiment of the invention, said first and a second transducer recess extends through a first and a second tube opening in said flow tube and into said flow channel.

Thereby, in the context of the above embodiment it is particularly advantageous that the size of the transducer recesses is reduced, thereby reducing the pressure from the fluid on the meter housing.

According to an embodiment of the invention, said ultrasound transducers are positioned inside said meter housing, and wherein at least one of said ultrasound transducers is configured for, during operation of said ultrasonic flow meter, to emit an ultrasound signal, said ultrasound signal propagating through said slanted bottom wall abutting said at least one ultrasound transducer, through said fluid in said flow channel, and said ultrasound signal being reflected by said one or more ultrasound reflectors, then propagating through said slanted bottom wall abutting the other ultrasound transducer receiving said ultrasound signal.

According to an embodiment of the invention, said first ultrasound transducer and said one or more ultrasound reflectors are positioned and orientated so that if, during operation of said ultrasound flow meter, a first ultrasound signal is emitted from said first transducer, said first ultrasound signal is reflected by said one or more ultrasound reflectors and detected by said second ultrasound transducer, and vice versa if said second ultrasound transducer emits a second ultrasound signal it is detected by said first ultrasound transducer.

According to an embodiment of the invention, said first and second ultrasound transducers are positioned and orientated so that when, during operation of said ultrasonic flow meter, a first ultrasound signal is transmitted from said first ultrasound transducer, said first ultrasound signal will propagate through said slanted bottom wall of said first transducer recess, through the fluid in the flow channel, reflected by said one or more reflectors, and through said slanted bottom wall of said second transducer recess, before being detected by said second ultrasound transducer, and vice versa a second ultrasound signal may be transmitted from said second ultrasound transducer to said first ultrasound transducer through said slanted bottom walls of said transducer recesses.

By a slanted bottom wall may in one embodiment be meant a bottom wall, where the surface this bottom wall is non-orthogonal to the direction the side walls of the transducer recess, i.e. an inclined bottom wall. Here it should be noted that the longitudinal axis of the recess is defined by the sides of the recess. Thereby, the longitudinal axes of the transducer recesses are preferably orientated orthogonal with a longitudinal axis of the flow tube. A particular aspect of the invention is that the first and second transducers are both placed in the meter housing. Thereby, it is to be understood that an ultrasound signal emitted by the first ultrasound transducer, and reflected by the one or more ultrasound reflectors, before being detected by the second transducer, will propagate from the emitting surface of the first transducer through the slanted bottom wall of the e first transducer recess, through the fluid in the flow channel, reflected by the one or more ultrasound reflectors while still propagating through the fluid, and through the slanted bottom wall of the second transducer recess, before finally reaching the transmitting surface of the second ultrasound transducer where the ultrasound signal is detected and transformed into an electrical signal by the second transducer. An example of such a transducer recess with a slanted bottom wall is a tube extending from the meter housing, and having a bottom wall the surface of which is being non-orthogonal to a longitudinal axis of the tube.

I.e. said housing comprises a first transducer recess, in which the first ultrasound transducer is positioned, and a second transducer recess, in which the second ultrasound transducer is positioned.

It is to be noted that since the transducer recesses each have a slanted bottom wall on which the ultrasound transducer is positioned, said first transducer has a first ultrasound transmitting surface and said second transducer has a second ultrasound transmitting surface, wherein said first and second transmitting surfaces have a non-orthogonal orientation with respect to a longitudinal axis of said first and second transducer recess, respectively. Also, one can equivalently define the orientation of the ultrasound transducers by said first and second ultrasound transmitting surfaces being non-parallel to a longitudinal axis of the flow channel. Yet another way of defining the orientation of the first and second ultrasound transducers is that the path of an ultrasound signal emitted by the first or second ultrasound transducer will be non-parallel to the longitudinal axes of the first and second transducer recesses, and also non-orthogonal to the longitudinal axis of the flow tube.

According to an embodiment of the invention, said longitudinal axis of each elongated transducer recesses is orthogonal with respect to a longitudinal axis of the flow channel.

Thereby, the assembly of the ultrasonic flow meter is made easy, since a single-piece meter housing can be inserted through tube openings in the flow tube and into the flow channel. Since this insertion is done by moving the meter housing in a direction orthogonal to longitudinal axis of the flow channel, this insertion is simple, and furthermore, the tube openings can be constructed with a size and form fitting the cross-sectional size and form of the transducer recesses, e.g. by fitting the diameter of the tube openings to the diameter of transducer recess for cylindrical transducer recesses.

According to an embodiment of the invention, the ultrasonic flow meter comprises a first, a second, and a third ultrasound reflector).

It is preferred that the ultrasonic flow meter comprises three ultrasound reflectors, preferably positioned in a so-called W-geometry. By a W-geometry is meant a position and orientation of the ultrasound transducers and the ultrasound reflectors such that the path of the ultrasound signal takes the form of a W when viewed from the side. Thereby, the path length of the ultrasound may be maximized to give a longer transit times. By increasing the transit times, it may be secured that the signal-to-noise ratio may be decreased, even for a compact flow meter. This is especially true for ultrasonic flow meters that in addition to a transit time differences includes an absolute transit time for flow measurements.

However, in alternative embodiments, only a single or two ultrasound reflectors are used. In some embodiments, where flow tubes of larger diameter are used it may be particularly advantageous to use only a single ultrasound reflector.

According to an embodiment of the invention, said housing comprises a battery.

Thereby, the ultrasonic flow meter is independent of an external power supply.

According to an embodiment of the invention, said housing comprises a display.

By said meter housing including a battery and a display, a simplistic design may be achieved where no need for external wiring is needed for power supply or communication. This may be a great advantage in the production of the meter, for the user who does not have to connect power supply or read-out equipment, and furthermore since the housing may be sealed to as to extend the life-time of the meter.

Furthermore, by incorporating all electronic equipment in the meter housing, the need for any external wiring to the meter is eliminated.

According to an embodiment, the paths of the ultrasound will lie within a longitudinal symmetry plane of the flow chamber, i.e. the parts of the path will span only a single plane parting the flow chamber in two equal-sized parts along the longitudinal direction. Alternatively, however, the ultrasound reflectors and possibly the transducers may be orientated such that the parts of the ultrasound paths do not fall within a single plane.

According to an embodiment of the invention, said ultrasound transducers have a bottom side facing the bottom walls of the first and second transducer recesses, and wherein the meter housing comprise a metal layer contact being in electrical contact with the bottom sides of the ultrasound transducers and in electrical contact with the electronic circuit.

By means of the metal layer, electronic contact is facilitated between the bottom sides of the ultrasound transducers and the electronic circuit. Such contact may otherwise be difficult to establish and may require a tedious assembly process. Furthermore, the metal layer provides compact electrical connections and thereby allows the assembly of a compact ultrasonic flow meter.

It is to be understood that this bottom side is the transmitting side of the ultrasound transducers, which during operation of the ultrasonic flow meter can emit or detect an ultrasound signal.

Another advantage of the above embodiment is that it is possible to use smaller transducers, such as smaller piezoelectric elements of the transducers. By using smaller transducers, the protrusions of the meter housing, which extends into the flow channel, may be decreased, resulting in a decreased pressure on the meter housing from the fluid in the flow channel. Such as pressure may indeed be very high, and may call for a forceful connection between the meter housing and the flow channel tube. However, by decreasing this pressure, such measures may not need to be taken into account, at least to a lesser degree.

According to an embodiment of the invention, each of the ultrasound transducers have an upper side connected to a first and a second elastic contact, respectively.

By an elastic contact is meant a flexible or spring-like contact. However, a coil spring may be unsuitable for contacting with the transducers, since these are orientated with an angle relative to the longitudinal axis of the flow chamber and therefore also relative to the meter housing. It may therefore be preferred to use a metal strip, which may be curved, to provide a flexible contact suitable for connecting said transducers to the electronic circuit.

Furthermore, since such elastic contacts may provide a force towards the flow chamber, or at least a force with a substantial component in a direction towards the flow chamber, the transducer may be fixated by this force. This may provide with improved electrical contact not only between the elastic contact and the transducer, but also between the transducer and the metal layer, or at least an ensured contact, i.e. less probability of loss of electrical connection.

In connection with the above embodiment, it should be understood that said upper and lower sides are to be understood as two opposing sides of the transducer. Since the transducers have an emitting surface, which is orientated with an angle relative to the longitudinal axis of the flow chamber, the lower side is to be understood as the emitting surface of the transducer, which faces the flow chamber, while the upper side should be understood as the opposite side or surface relative to the lower side.

Another advantage of the above embodiment is that it is possible to use smaller transducers, such as smaller piezoelectric elements of the transducers. By using smaller transducers, the protrusions of the meter housing, which extends into the flow channel, may be decreased, resulting in a decreased pressure on the meter housing from the fluid in the flow channel. Such as pressure may indeed be very high, and may call for a forceful connection between the meter housing and the flow channel tube. However, by decreasing this pressure, such measures may not need to be taken into account, at least to a lesser degree.

Furthermore, since metal spring contacts may traditionally be used to provide electrical connection between the electronic circuit and the transducers, and since such metal springs are unsuitable for use with slanted transducers due to a geometric misfit, such slanted transducers may traditionally be considered disadvantageous. However, the elastic contacts provide a simple solution for using the slanted transducers.

According to an embodiment of the invention, the elastic contacts comprise curved metal strips.

According to an example embodiment the transducers are piezoelectric elements. By contacting two opposing sides of such a piezoelectric element to an electrical power source, and by means of the electrical power source putting an alternating voltage across the piezoelectric element, the piezoelectric element vibrates according to the alternating voltages thereby generating an acoustic signal, such as an ultrasound signal.

According to an embodiment of the invention, the ultrasound transducers are focused.

By focusing the ultrasound signal by using focused transducers, several advantages are obtained. One of these advantages is that the intended signal, i.e. the signal following the first or second ultrasound path, may be transmitted more efficiently from the first transducer to the second transducer and vice versa. Another advantage is that unintended ultrasound paths, such as the V-path, will be transmitted less efficiently between the two ultrasound transducers.

According to an embodiment of the invention, the ultrasonic flow meter furthermore comprises a flow channel insert.

Such a flow channel insert may provide a single and therefore cost-effective assembly of the compact flow meter. Furthermore, such a flow channel insert may provide fixation of ultrasonic reflectors, narrowing of the room in which the fluid may flow resulting in a higher flow velocity, guiding of the fluid to increase the overlap with the ultrasound path, blocking or otherwise discrimination of unwanted or parasitic ultrasound paths.

Preferably, such a flow channel insert may be assembled from two half-parts, preferably mirror-symmetrical.

According to an embodiment of the invention, said one or more ultrasound reflectors are fixated in said flow channel insert.

For example, the ultrasound reflectors may be fixated in the flow channel insert in the assembly of the flow channel insert, preferably by assembling the flow channel insert from two half-parts and fitting the ultrasound reflectors in between the half-parts. By said ultrasound reflectors being fixated to said flow channel insert, it is to be understood that the ultrasound reflectors may form a part of the flow channel insert.

According to an embodiment of the invention, the flow channel insert comprises guide elements for guiding the flow of the fluid.

By said guide elements the flow of the fluid through the flow channel insert is modified to provide a greater spatial overlap between the flow path and the ultrasound signal path. This effect is especially pronounced for smaller meters. By increasing the overlap, the interaction may also be increased, which leads to a greater difference in upwards and downwards travel times, which in turn may result in a lesser uncertainty in the measurement of the velocity of the fluid flow by decreasing the signal-to-noise ratio.

Furthermore, since the guide elements may protrude into the inner space of the flow chamber, they may along with the rest of the flow channel insert contribute to an increased local pressure of the fluid in the flow channel insert, which leads to a greater difference between the upwards and the downwards transit times of the ultrasound signal, thereby decreasing the relative uncertainty of the measured fluid flow velocity.

According to an embodiment of the invention, the guiding elements of the flow channel insert are adapted for extinguish ultrasound.

By extinguish is meant that the guiding element discriminates against any ultrasound signal which is incident in the surface of the guiding element. The physical mechanisms of this extinguishing may be different, such as e.g. blocking or absorbing the ultrasound signal, by scattering the ultrasound signal, or by redirecting ultrasound signal such that it to a lesser degree reaches the which should detect the ultrasound signal with the correct travel path. Such redirection may e.g. be by defocusing or reflection in a certain direction etc. Defocussing may e.g. be done by a convex surface. This effect gives the advantage of interfering and possibly blocking alternative paths of the ultrasound pulses from the first transducer to the second transducer and vice versa, such as e.g. the so-called V-path.

According to an embodiment of the invention, one or more of the ultrasound reflectors are focusing.

This may preferably be done by using concave reflectors. Alternatively, it may be done by means of lens-like objects in front of the reflectors, or a combination thereof concave mirror and lens-like objects. This discriminates between the W-path and other paths, which are un-wanted or parasitic, such as the V-path, by increasing the signal from the W-path.

According to an embodiment of the invention, reflective surfaces of the first and third ultrasound reflectors are orientated such that these reflective surfaces have angle with respect to the longitudinal axis of the flow channel.

In the present context having an angle with respect to the longitudinal axis of the flow channel is to be understood as the reflecting surface of the ultrasound reflector being non-parallel to the longitudinal axis. In cases where the ultrasound reflectors are non-plane, it is to be understood that the ultrasound reflector according to the present embodiment is orientated such that the plane surface, which makes the best approximation for the reflective non-plane surface, is non-parallel with the longitudinal axis. Such a best approximation could e.g. be the plane, which gives the same direction of propagation of the reflected ultrasound signal as the actual reflector does.

An advantage of the above embodiment is that the same meter housing may be fitted to different flow channel tubes of different diameters without changing the orientation of the ultrasound transducers. Instead, the non-parallel ultrasound reflectors may be positioned and orientated according to the geometry of the flow channel tube, e.g. by fixation of the ultrasound reflectors in different flow channel inserts adapted to fit the respective flow channel tubes. Thereby, only a single type of meter housings has to be produced, and since tools to produce this part may constitute a dominant part of the manufacturing expenses, this is a great advantage. Also, existing meter housings may be adapted to other flow channel tubes without adjustment of the ultrasound transducers.

A further advantage of using slanted reflectors is that this may prevent the collection of debris from the fluid in the reflectors, or at least decrease the effect of such debris collection. Though some debris may collect on the reflector, due to the asymmetry orientation of the reflector, the debris collection may be largely confined to areas near the edge of the reflector, which thereby maintains a high reflectively of the ultrasound signal.

According to an embodiment, the one or more ultrasound reflectors are fixated to the flow channel insert. This may e.g. be done by assembling the flow channel insert from two symmetrical elements, which when assembled lock together about the one or more ultrasound reflectors.

According to an embodiment of the invention, the flow channel insert is fixated relative to the flow tube by the meter housing.

This fixation may e.g. be provided by letting the meter housing have two protrusions containing the two ultrasound transducers. These two protrusions may then extend into the flow channel According to an embodiment of the invention, the meter housing is fixated relative to the flow tube by one or more locking pins.

By means of one or more of the above embodiments, the flow meter may be assembled by said flow channel insert fixating said ultrasound reflectors, furthermore by said meter housing fixating said flow channel insert, and finally by said meter housing being fixated to said flow channel by means of a split insert. Thereby, an advantageous assembly method for assembling said flow meter is provided. One advantage of this assembly method is that it may be done without adjusting the orientation of transducers and/or ultrasound reflectors, as these are determined from their respective holding means, i.e. the meter housing for the transducers and the flow channel insert for the ultrasound reflectors.

The invention furthermore relates to a method of assembling an ultrasonic flow meter, said ultrasonic flow meter comprising
  a meter housing,
  a flow tube defining an inner flow channel for a fluid to be measured, and
  a flow channel insert,
  said flow channel insert comprising
  one or more ultrasound reflectors and a first and a second insert opening,
said meter housing comprising
a first transducer recess,
a second transducer recess,
a first ultrasound transducer positioned in said first transducer recess,
a second ultrasound transducer positioned in said second transducer recess, and
an electronic circuit for operating said ultrasonic flow meter,
wherein said transducer recesses each has slanted bottom walls, and
wherein said first and second ultrasound transducers are in abutment with said slanted bottom walls of said first and second transducer recess, respectively, said method comprising the steps of
inserting said flow channel insert into said flow channel,
inserting said first and second transducer recesses through said first and second tube openings and into said first and second insert openings, and
fixating said meter housing to said flow tube.

Thereby, a simple method of assembling an ultrasonic flow meter is provided, which is efficient and cost-effective. This is an advantage of the invention.

According to an embodiment of the invention, the method according to the above embodiment is provided for of assembling an ultrasonic flow meter according to any embodiment of the invention.

FIGURES

Figure 2:
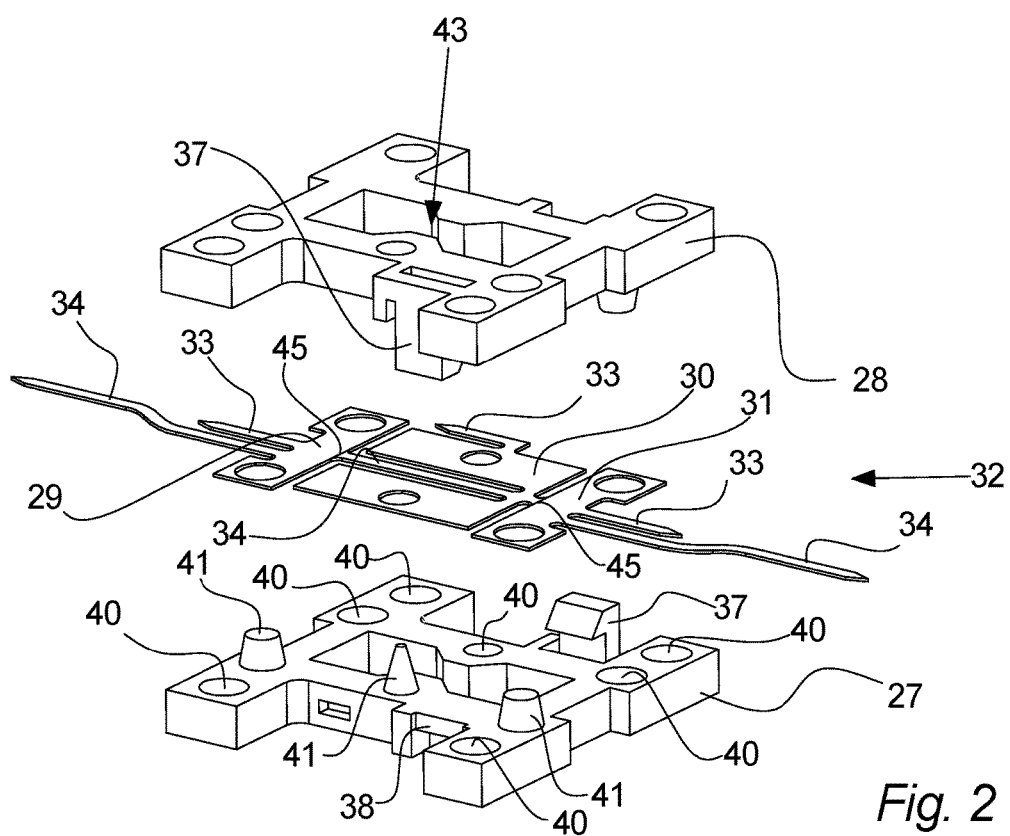
Figure 3:
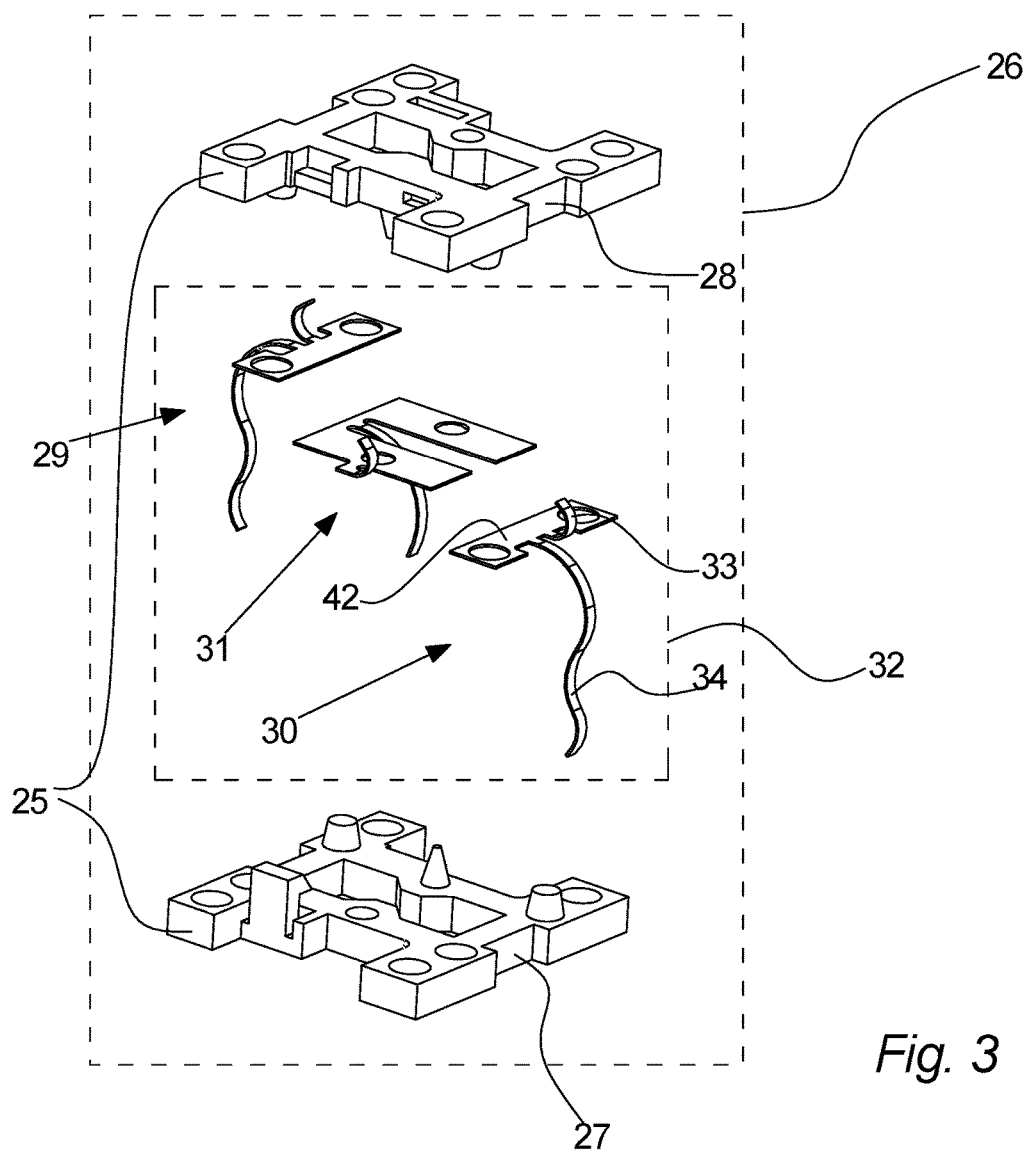
Figure 4:
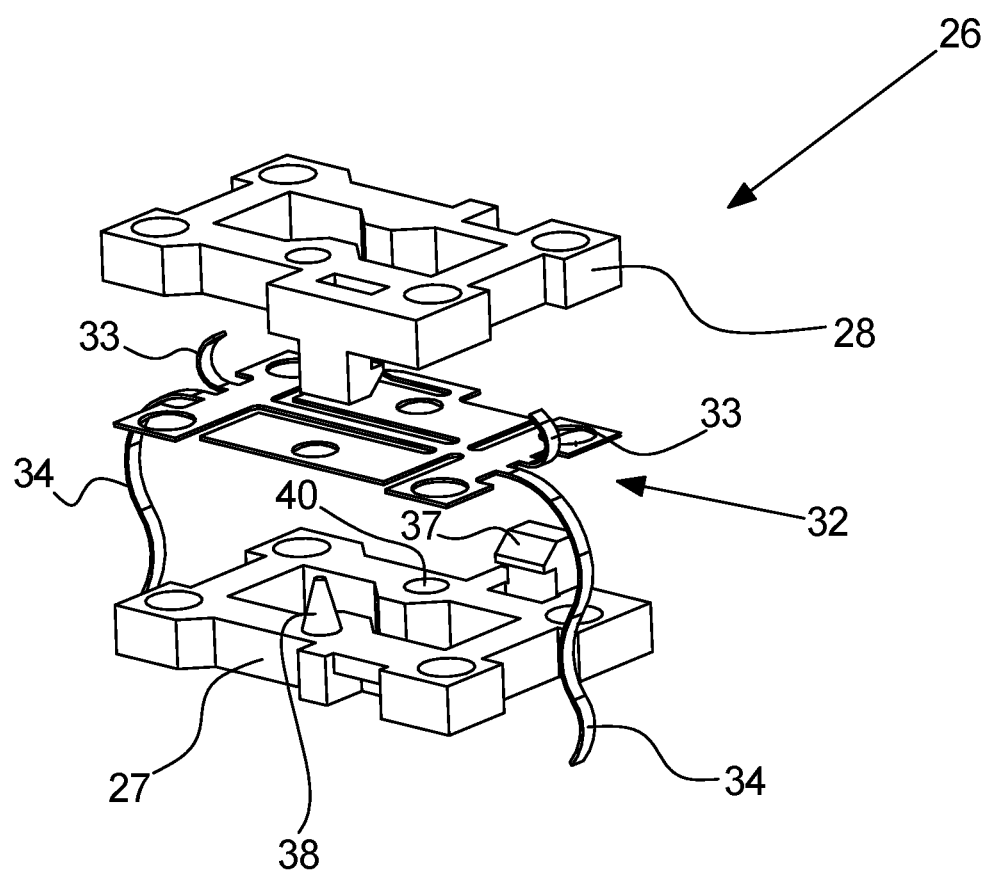
Figure 5:
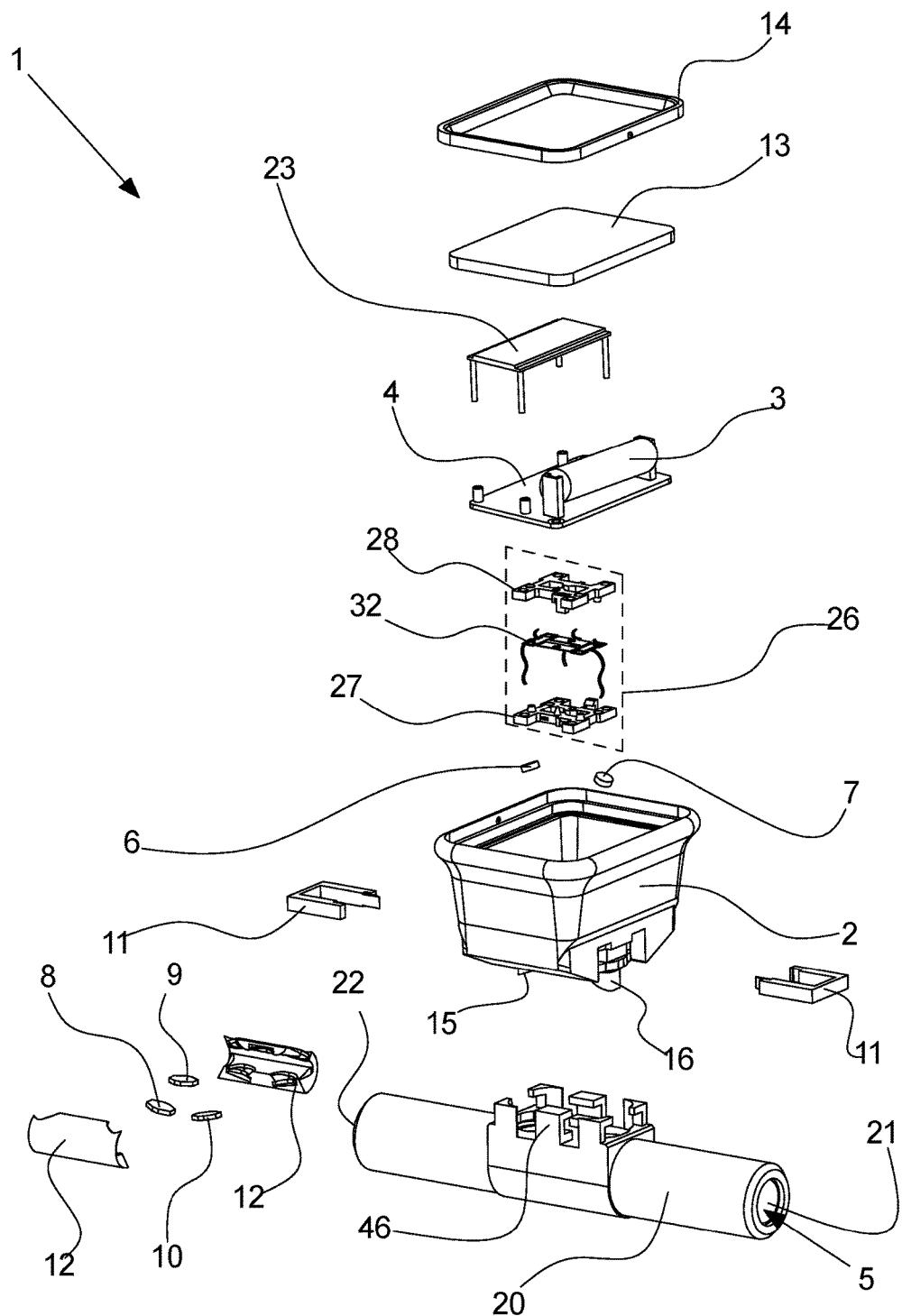
Figure 6:
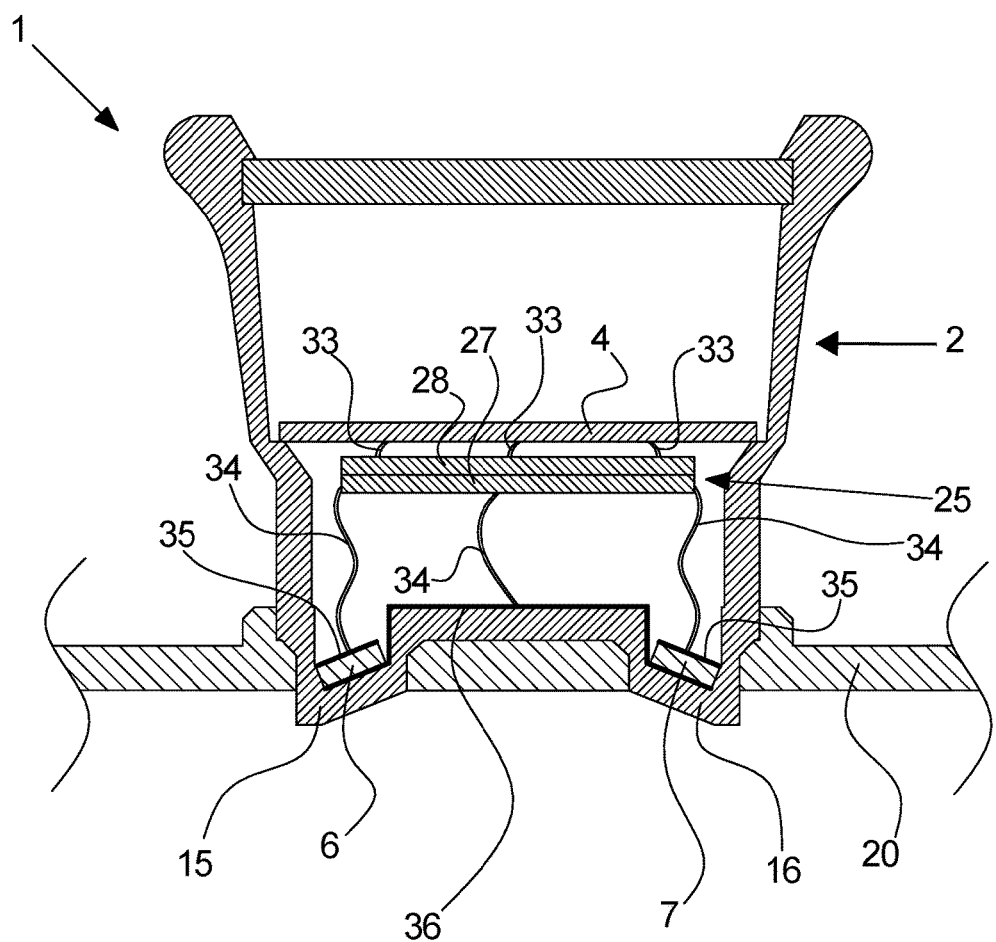
Figure 7:
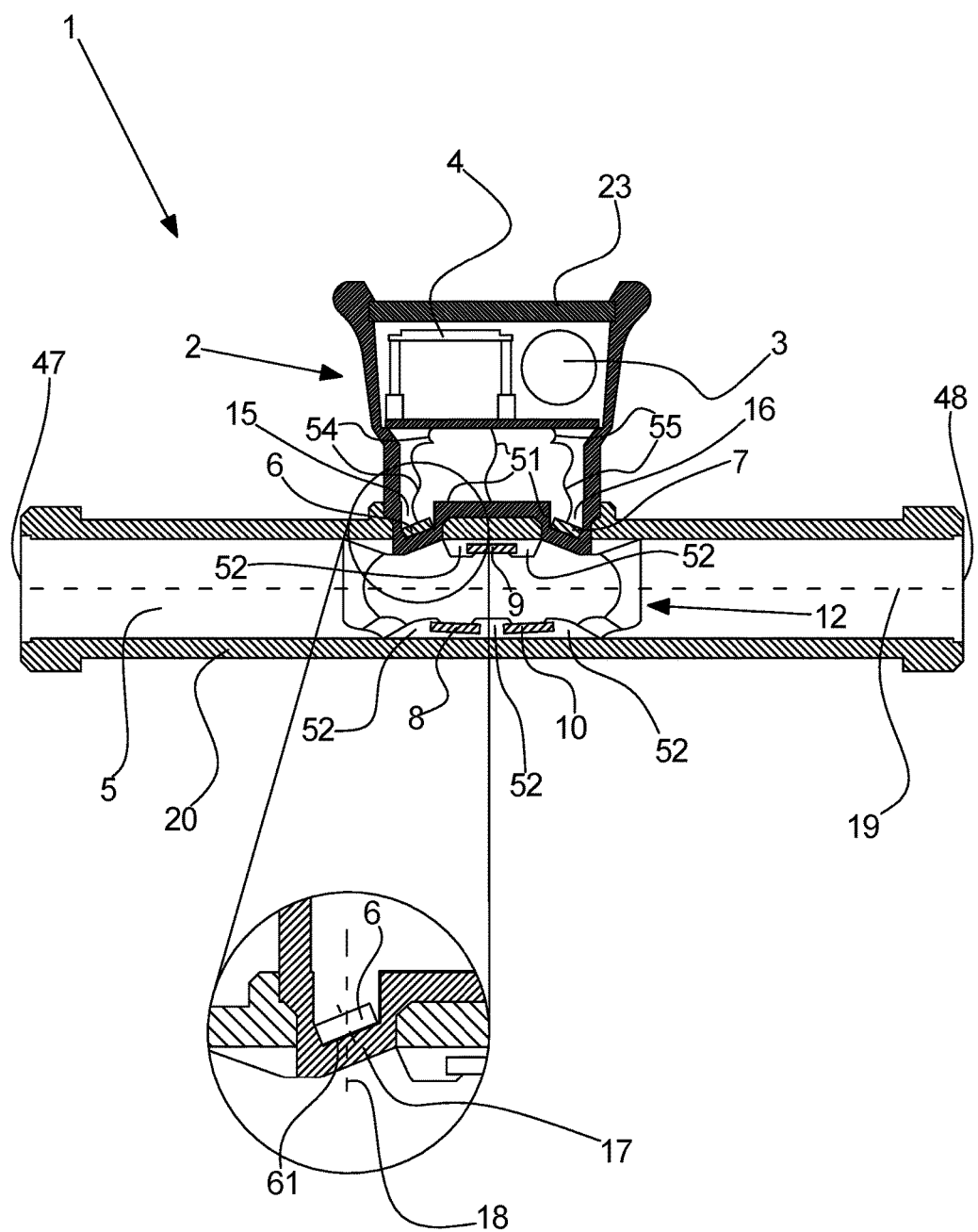
Figure 8:
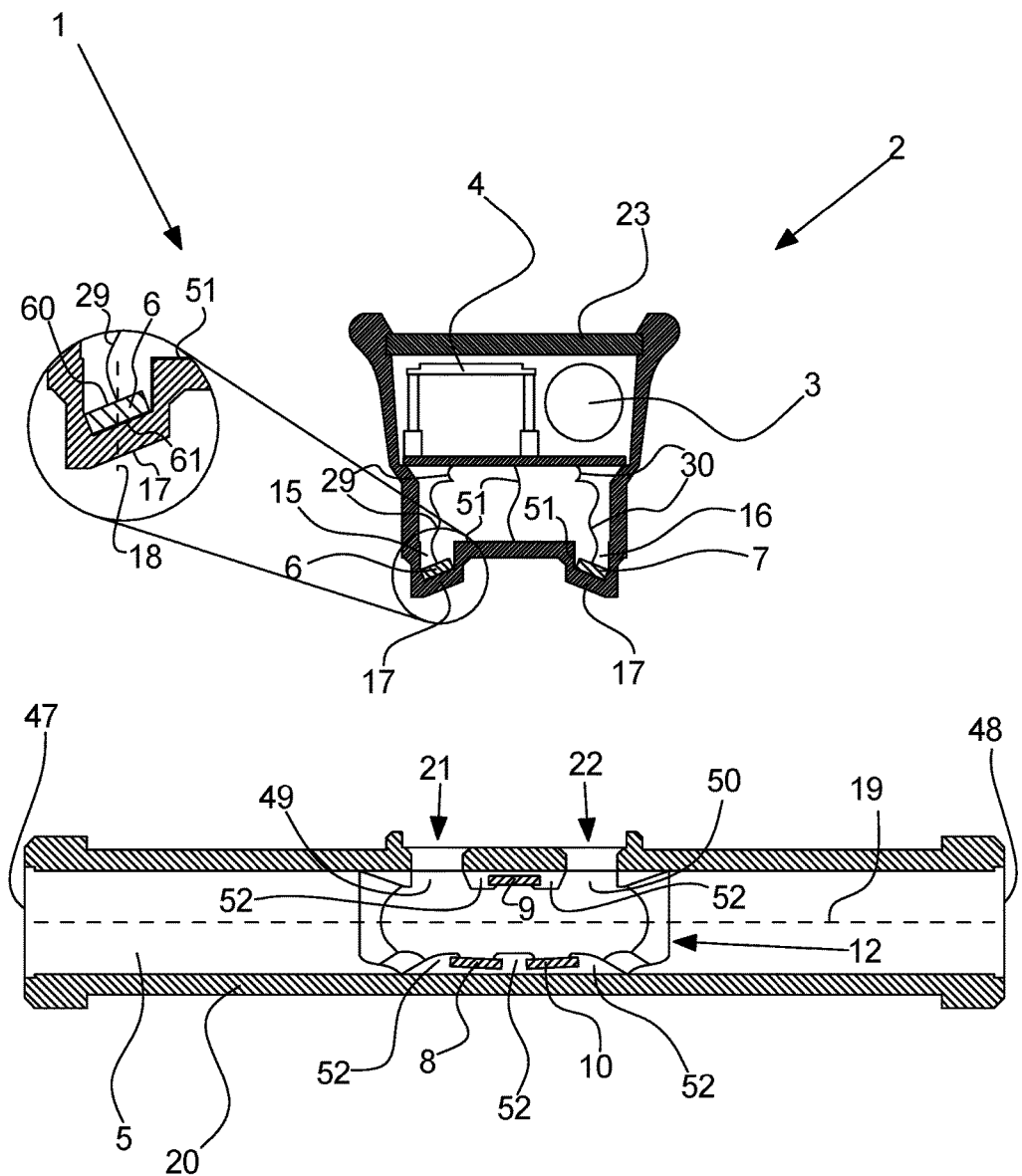
Figure 9:
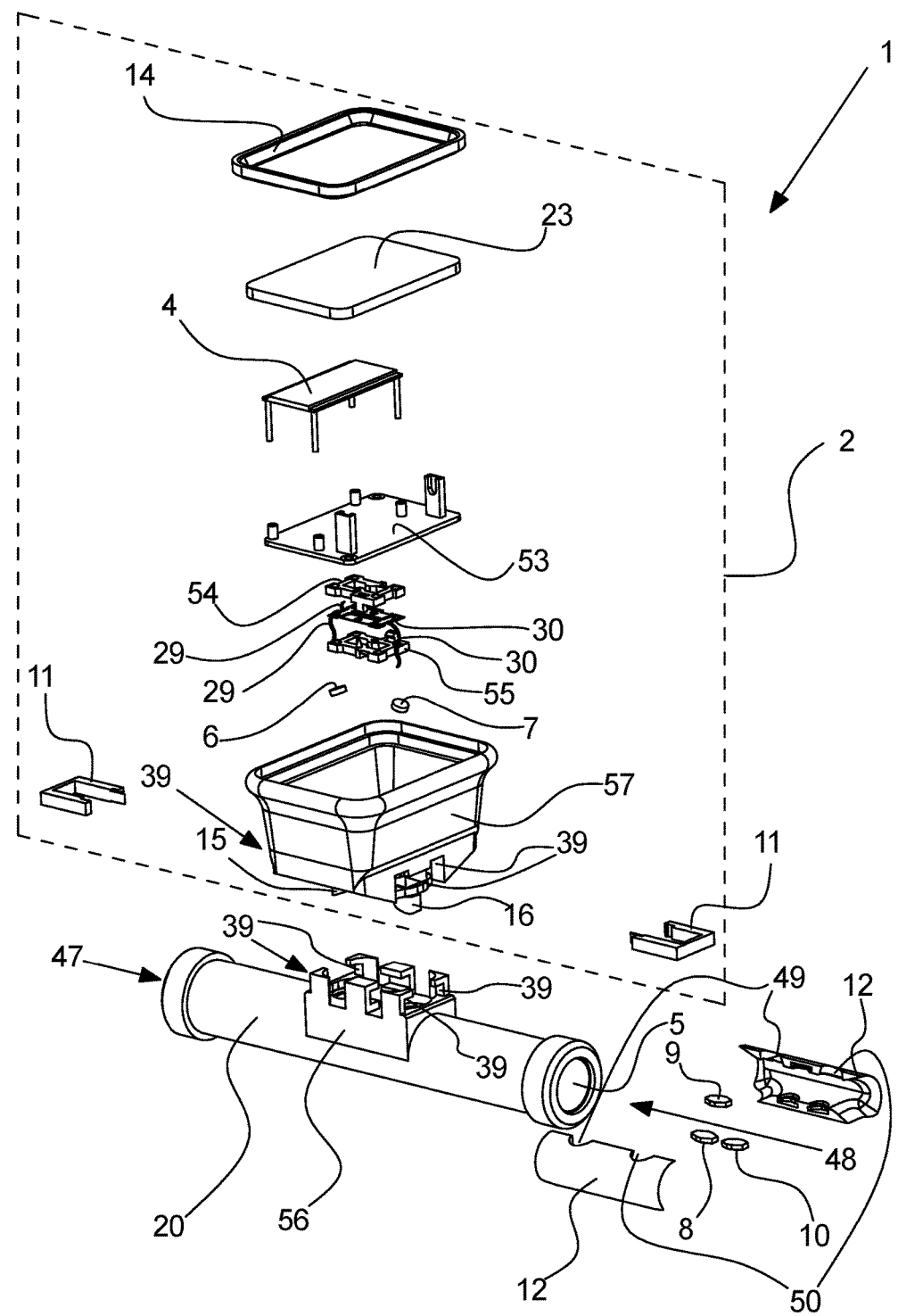
Figure 10:
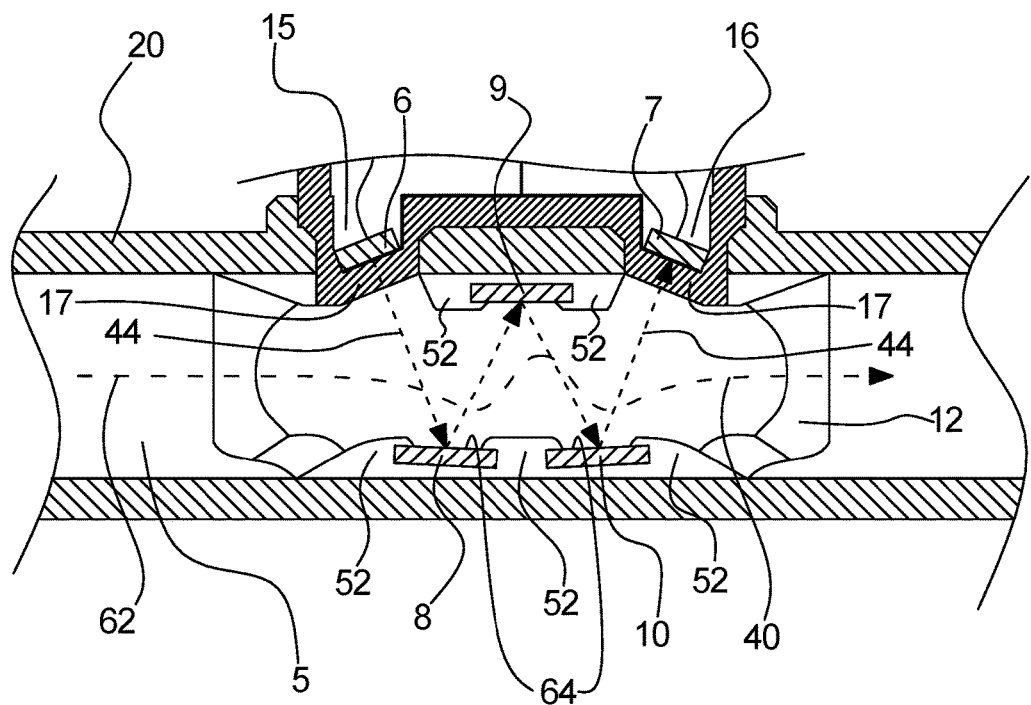
Figure 11A:
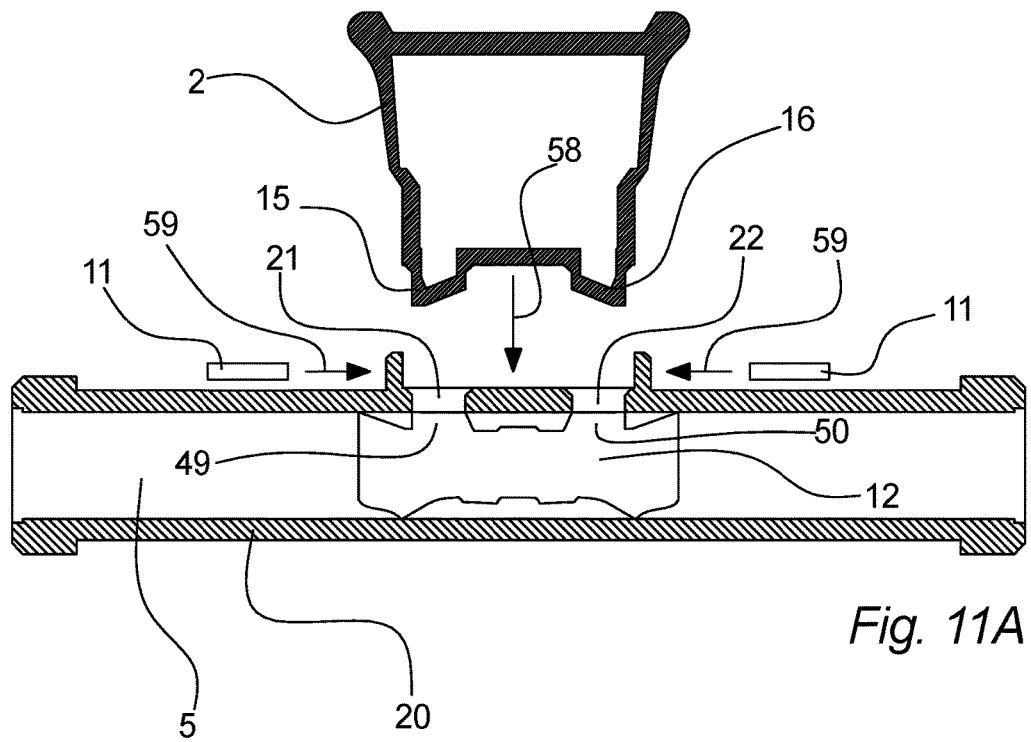
Figure 11B:
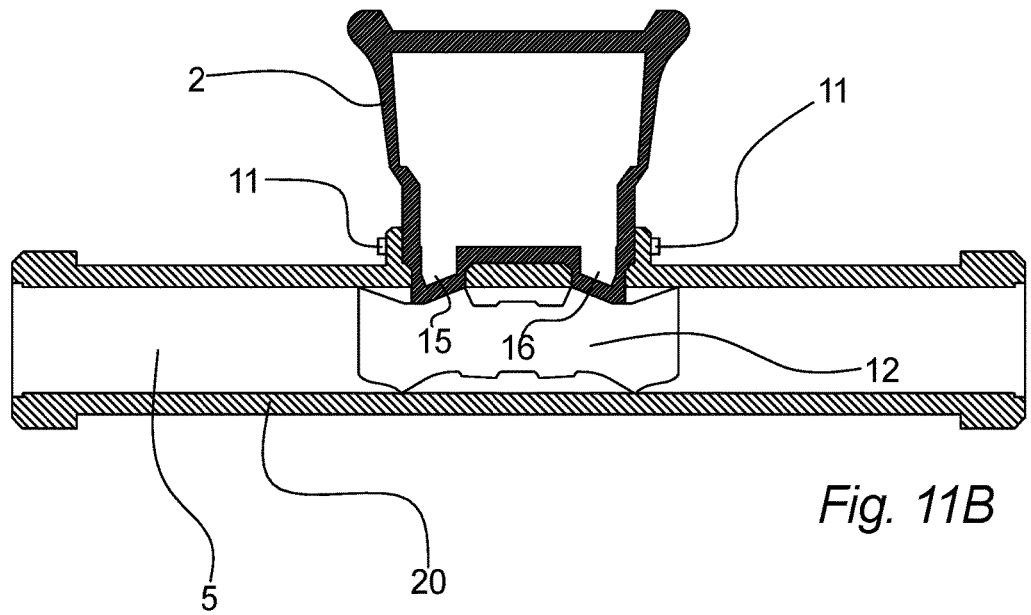
Figure 12:
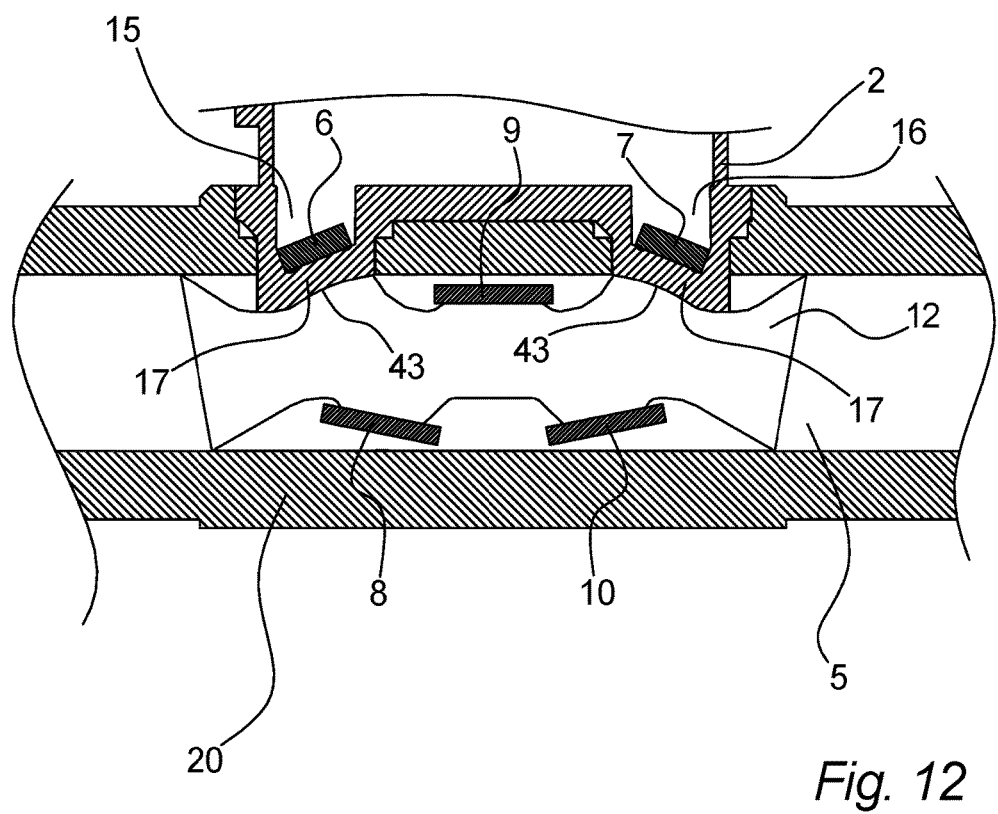
Figure 13A:
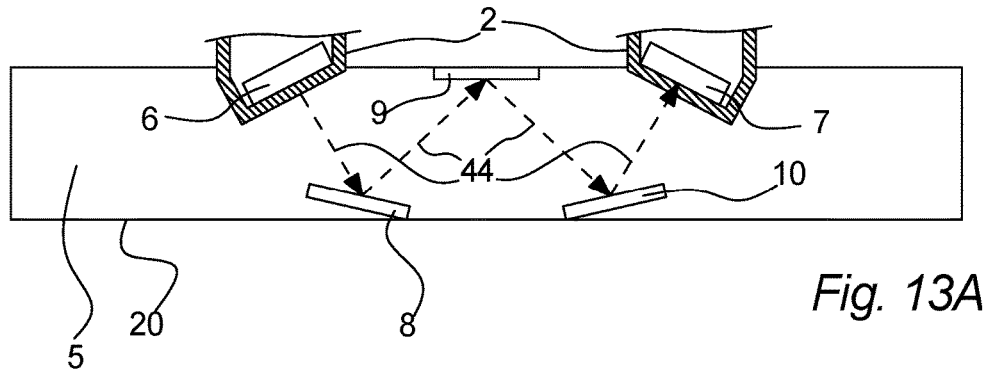
Figure 13B:
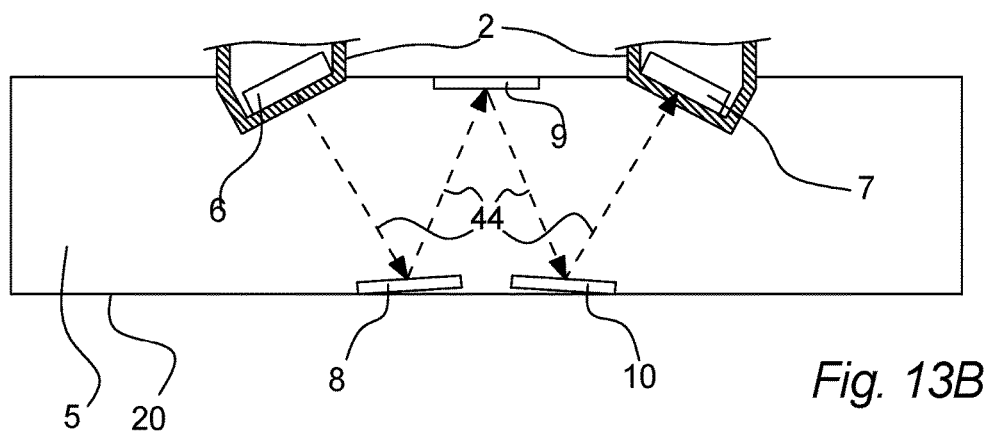
Figure 13C:
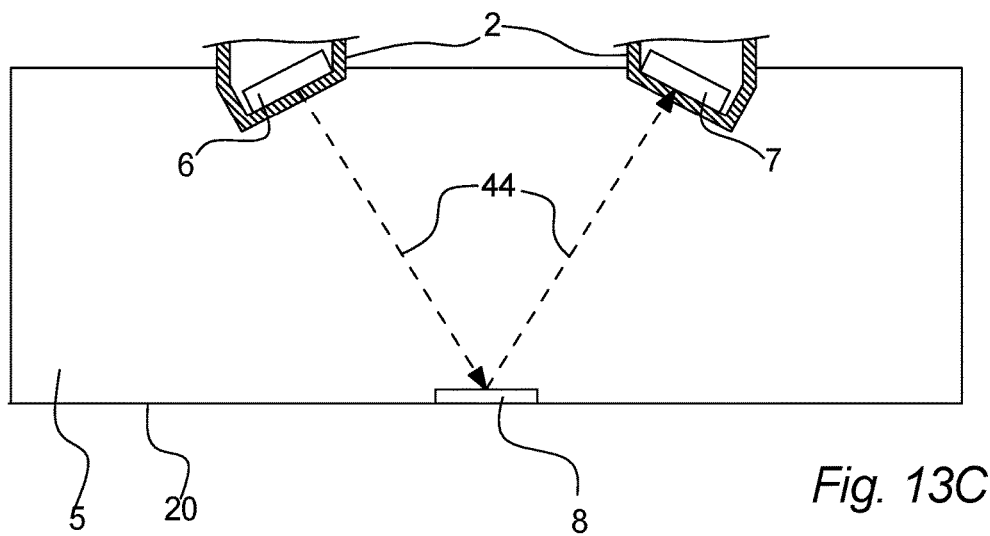

The invention will be described in the following with reference to the figures in which FIG. 1 illustrates a connection arrangement according to an embodiment of the invention, FIG. 2 illustrates a connection arrangement according to an embodiment of the invention prior to assembly, FIG. 3 illustrates an exploded view of a connection arrangement according to an embodiment of the invention, FIG. 4 illustrates a connection arrangement according to an embodiment of the invention, FIG. 5 illustrates an exploded view of an ultrasonic flow meter according to an embodiment of the invention, FIG. 6 illustrates a part of an ultrasonic flow meter according to an embodiment of the invention in a cross-sectional view, FIG. 7 illustrates a cross-sectional view of an ultrasonic flow meter according to an embodiment of the invention, FIG. 8 illustrates a cross-sectional view of an ultrasonic flow meter prior to assembly of the meter housing with the flow tube according to an embodiment of the invention, FIG. 9 illustrates the parts of a cross-sectional view of an ultrasonic flow meter according to an embodiment of the invention, FIG. 10 illustrates the flow path and the path of an ultrasound signal according to an embodiment of the invention, FIGS. 11A and 11B illustrates an ultrasonic flow meter and a method of assembling this according to an embodiment, FIG. 12 illustrates a cross-sectional view of an ultrasonic flow meter with focusing transducers according to an embodiment, and FIGS. 13A, 13B, and 13C show schematic illustrations ultrasonic flow meters with different flow tube diameters of according to an embodiment.

DETAILED DESCRIPTION OF THE INVENTION

Referring to FIG. 1, a connection arrangement 26 according to an embodiment of the invention is illustrated. The connection arrangement 26 comprises a set 32 of elastic connectors 29, 30, 31, namely a first connector 29, a second connector 30, and a third connector 31. Each connector comprises a first spring part 33 and a second spring part 34. The set 32 is fixated by an insulating support arrangement 25 made up by a first and a second insulating part 27, 28. Said insulating parts 27, 28 each comprise a latch 37 and a notch 38. The latch 37 on each insulating part 27, 28 is engaging the notch 38 on the opposite insulating part 27, 28, thereby fixating the two insulating parts 27, 28 to each other, and, furthermore, fixating each of the connectors 29, 30, 31. The connectors 29, 30, 31 are thereby kept fixated in a single connection arrangement 26, but kept electrically separated and insulated from each other. It is thereby possible to bring an electronic control arrangement 4 engaged by the first spring parts 33 in electronic connection with a first and second ultrasound transducers 6, 7, thereby enabling the electronic control arrangement 4 to control said transducers 6, 7, i.e. to control emission of ultrasound signals and read-out measurements from the transducers.

Now, referring to FIG. 2, the first and second insulating parts 27, 28 are shown with the set 32 of connectors 29, 30, 31 according to the above embodiment. As can be seen, the three connectors 29, 30, 31 are connected to each other. This illustrates an advantageous method of producing and assembling a connection arrangement 26. The still connected set 32 of connectors 29, 30, 31 as seen on FIG. 2 can advantageously be made by punching it out of a single metal sheet. Afterwards, the connectors 29, 30, 31 may be separated by cutting along cutting lines 45. Also, the first and second spring parts 33, 34 on each connector 29, 30, 31 may be bent into suitable shape, as illustrated in FIG. 1. Both separation and bending may preferably be done after joining the first and second insulating parts 27, 28 into the insulating support arrangement 25 illustrated in FIG. 1. Furthermore, to allow easy access to cutting the connectors 29, 30, 31 from each other, an opening 43 exists in both insulating parts 27, 28. Also, in further detail, when joining the two insulating parts 27, 28, the pins 41 on each insulating part 27, 28 are inserted into corresponding holes or recesses 40 on the opposite insulating part 27, 28 thereby stabilizing relative position of the insulating parts 27, 28 with respect to transverse movement, while the latch 37 on each insulating part 27, 28 engages a corresponding notch 38 on the opposite insulating part 27, 28, thereby locking the two insulating parts 27, 28 together.

Now, referring to FIG. 3, the connection arrangement 26 is illustrated according to an embodiment of the invention and further to the embodiments illustrated on FIGS. 1 and 2. The connection arrangement 26 comprises an insulating support arrangement 25 and a set 32 of connectors 29, 30, 31. The insulating support arrangement 25 comprises a first and a second insulating part 27, 28. Each connector 29, 30, 31 comprises a first spring part 33, a second spring part 34, and a fastening part 42, the fastening part 42 may e.g. preferably be a flat piece of metal with one or more through-holes allowing the pin 41 and hole 40 lock of the two insulating parts 27, 28 to fixate the movement of the connector 29, 30, 31 relative to the insulating support arrangement 25. The connectors 29, 30, 31 are here shown separated with bent first and second spring parts 33, 34 even though they are not fixated by the insulating support arrangement 25. Although the connection arrangement 26 may be assembled this way, it may typically, according to an embodiment, be more advantageous to fixate the connectors 29, 30, 31 by the insulating support arrangement 25 before separating them from each other, e.g. as described in relation to FIGS. 1 and 2.

Now, referring to FIG. 5, an ultrasonic flow meter 1 according to an embodiment of the invention is illustrated. The ultrasonic flow meter 1 is shown in an exploded view showing many important components. The ultrasonic flow meter 1 according to the present embodiment comprises a flow tube 20, a meter housing 2 comprising a first and second transducer recess 15, 16, two locking pins 11, a flow channel insert 12, a first, second, and third ultrasound reflector 8, 9, 10, a first and a second ultrasound transducer 6, 7, a connection arrangement 26, an electronic control arrangement 4, a battery 3, a display 23, a piece of glass 13, and a fixation frame 14. The first and second transducer 6, 7 are inserted into the first and second transducer recess 15, 16, respectively, such that the emitting surface of the transducer 6, 7, is in abutment with the slanted bottom wall of the corresponding transducer recess 15, 16. The flow channel insert 12 comprises two half-parts, which each comprise three depressions for fitting the three ultrasound reflectors 8, 9, 10 into. Thereby, when assembled, the flow channel insert 12 holds and fixates the three ultrasound reflectors 8, 9, 10 relative to the flow channel insert 12. The flow channel insert 12 may be inserted into the flow channel 5, which is defined as the inner space of the flow tube 20, through the first or second tube openings 21, 22. The meter housing 2 may then be fixated to the tube fixation arrangement 46 of the flow tube 20 by inserting the transducer recesses 15, 16, which are protrusions seen from the outside of the meter housing 2, into through-holes in the tube fixation arrangement 46 and inserting locking pins 11 into the tube fixation arrangement 46. Thereby, the transducer recesses 15, 16 are inserted at least partly into the flow channel 5 and into corresponding openings of the flow channel insert 12, thereby locking the position of the flow channel insert 12 relative to the flow tube 20. Also, transducers 6, 7 positioned on the slanted bottom walls of the transducer recesses may transmit ultrasound directly into the flow channel 5 without the ultrasound having to pass through the walls of the flow tube 20. Finally, by means of the locking pins 11, the meter housing 2 is fixated to the flow tube 20. The flow channel insert 12, defining the positions of the ultrasound reflectors 8, 9, 10, is designed such that an ultrasound signal emitted by a first transducer 6 positioned with the ultrasound emitting surface in abutment with the slanted bottom wall of the first transducer recess 15 will be subsequently reflected by said first, second, and third ultrasound transducer and thereby guided to said second ultrasound transducer 7, or vice versa from said second transducer 7 to said first transducer 6. The connection arrangement 26 comprising the set 32 of connectors fixated between the first and second insulating parts 27, 28 (e.g. as seen on FIG. 1), is inserted into the meter housing 2 such that second spring parts 34 engages the ultrasound transducers 6, 7. Then, the electronic control arrangement 4 is inserted into the meter housing 2 and engages the first spring parts 33, thereby establishing electrical connection from the electrical control arrangement 4 to the first and second ultrasound transducers 6, 7. Preferably, according to an embodiment, said electronic control arrangement 4 may then be fixated to said meter housing 2 by fastening means, such as e.g. one or more screws. Finally, the display 23 may be connected to the electronic control arrangement 4 and the meter housing sealed by the glass piece 13 and the fixation frame 14.

Referring to FIG. 4, a connection arrangement 26 is illustrated according to an embodiment of the invention. The connection arrangement 26 have a design similar to that which is illustrated on FIG. 3, however, the insulating parts 27, 28 have different design, e.g. with fewer pins.

Now, on FIG. 6 is illustrated in a cross-sectional view a part of an ultrasonic flow meter 1 according to an embodiment of the invention and further to the illustrations of the previous figures. As seen the meter housing 1 is inserted into the flow tube 20, i.e. so that the transducer recesses 15, 16 extend partly through the walls of the flow tube 20. The first, second, and third connectors 29, 30, 31 are fixated by the first and second insulating parts 27, 28 of the insulating support arrangement 25. The first spring parts 33 are shown to engage the electronic control arrangement 4, thereby establishing electrical contact from the individual connectors 29, 30, 31 to relevant contacts on the electronic control arrangement 4. Furthermore, the second spring parts 34 are shown in contact with contacts 35, 36 of the transducers 6, 7. In more detail, the second spring part 34 of the first connector 29 engages a first contact 35 of the first transducer 6 thereby establishing electrical connection between the first contact 35 of the first transducer 6 and the electronic control arrangement 4. Second, the second spring part 34 of the second connector 30 engages a first contact 35 of the second transducer 7 thereby establishing electrical connection between the first contact 35 of the second transducer 7 and the electronic control arrangement 4. Finally, the transducers share a common second contact 36, which may e.g. be a metal coating on the inside of the meter housing 2. The second spring part 34 of the third connector 31 engages a second contact 36 of the first and second transducers 6, 7 thereby establishing electrical connection between the second contact 36 of the first and second transducer 6, 7 and the electronic control arrangement 4. In alternative embodiments, the connection arrangement may comprise a fourth connector and establish connection between the electronic control arrangement 4 and individual second contacts of the first and second transducers 6, 7. As can be seen on FIG. 6, of the second spring parts 34 of the connection arrangement 26 are each in contact with one of the first contacts 35 of each transducer 6, 7. Thereby, the transducer 6, 7, which are in contact with the meter housing 2, may apply a force on the connection arrangement 26 in an upwards (as views on FIG. 6) direction. Furthermore, since the electronic control arrangement 4 may often be fixated to the meter housing 2, the electronic control arrangement 4 may then apply a downwards (as views on FIG. 6) force on the connection arrangement 26. Due to these forces, the connection arrangement 26 may be fixated between the transducers 6, 7 and the electronic control arrangement 4, and the electronic contact between the transducers and the second spring part 34 and between the electronic control arrangement 4 and the first spring parts 33 may be established and maintained.

Referring to FIG. 7, an embodiment of the invention is illustrated. An ultrasound flow meter 1 is shown; the ultrasound flow meter 1 comprising a meter housing 2, a flow tube 20, and a flow channel insert 12. The meter housing 2 comprises an electronic circuit 4, a battery, a first and a second transducer recess 15, 16, a first and a second transducer 6, 7, a first and a second elastic contacts 54, 55, a metal layer contact 51, and a display 23. The electronic circuit 4, which is powered by the battery 3, and which is in contact with the first and a second transducer 6, 7 via the first and the second elastic contact 54, 55 and the metal layer contact 51, which comprises a metal layer and an elastic part. The first and second ultrasound transducers 6, 7 are positioned in the first and second transducer recesses 15, 16, respectively. As can be seen on FIG. 7, these transducer recesses 15, 16 each have slanted bottom walls 17. Since the first and second transducers 6, 7 are positioned in the bottom of the transducer recesses 15, 16, ultrasound emitting surfaces 61 of the ultrasound transducers 6, 7 are for each transducer 6, 7 orientated non-orthogonal with respect to a longitudinal axes 18 of the transducer recesses 15, 16. This longitudinal axis 18 may be defined e.g. to be parallel to the side walls of the respective transducer recess 6, 7. The flow channel insert 12 comprises a first, a second, and a third ultrasound reflector 8, 9, 10, which are positioned and oriented to reflect and guide and ultrasound signal emitted by the first ultrasound transducer 6, onto the second ultrasound transducer 7, which then can detect the ultrasound signal, and vice versa reflect or guide an ultrasound signal from the second ultrasound transducer to the first ultrasound transducer. The flow tube 20 has a first and a second tube end opening 47, 48 and defines a flow channel 5 as an inner space between the tube end openings 47, 48. During operation of the ultrasonic flow meter 1, the first and second tube end openings are connected to a piping system for moving said fluid. The fluid flows through the first tube end opening, through the flow channel 5, and out through the second tube end opening 47, 48, or the opposite direction. During the following description, the fluid is described as flowing from the first to the second tube end opening 47, 48, but of course the fluid may flow in the opposite direction. An ultrasound signal is emitted from the first ultrasound transducer 6. The ultrasound signal moves through the slanted bottom wall 17 of the first transducer recess 15, through the fluid onto the first ultrasound reflector 8, which reflects the ultrasound in a direction towards the second ultrasound reflector 9, which in turn reflects the ultrasound signal in a direction towards the third ultrasound reflector 10. The third ultrasound reflector 10 reflects the ultrasound signal towards to second ultrasound transducer 7. The ultrasound signal moved through the slanted bottom wall 17 of the second transducer recess 16 and onto the second ultrasound transducer 7, where the ultrasound signal is detected and converted into an electronic signal, which is sent to the electronic circuit 4. Then, an ultrasound signal may be sent in the opposite direction, i.e. from the second ultrasound transducer 7 to the first ultrasound transducer 6, where the signal is also converted into an electrical signal, which is sent to the electronic circuit 4. By comparing the travel time of the two ultrasound signals, i.e. the temporal duration between the moment where the ultrasound signal is emitted by the one transducer and until the moment it is detected by the other transducer, the velocity of the fluid may be calculated. Then by knowing the flow profile of the flow tube 20, the flow velocity is converted into a volume per time. Finally, by summing this volume per time over time, the consumed volume is measured. These calculations in some embodiments be performed by the electronic circuit 4, but may also be performed at a central facility of a utility company, i.e. the meter data such as travel times or other data representative of travel times may be extracted from the meter by e.g. manual read-outs or using wireless technology, such as e.g. radio communication.

According to an embodiment of the invention, the velocity of the fluid flowing through the measurement chamber can be calculated on the basis of a measurement of the transit time (time-of-flight) from the first transducer to the second transducer and vice versa, preferably by measuring the difference in the two transit times. The relationship between the transit times ($t_{up}$=transit time when the ultrasound signal propagates against the fluid flow, $t_{down}$=transit time when the ultrasound signal propagates in the same direction as the fluid flow) and the flow velocity of the fluid may vary according to different geometries, i.e. with different flow paths ultrasound signal. However, it may typically apply that $$v_{fluid} \propto \frac{\Delta t}{t^2}$$

where $v_{fluid}$ is the flow velocity of the fluid flowing through the measurement chamber, $\Delta t$ is the difference between the transit time against the flow $t_{up}$ and the transit time with the flow $t_{down}$, and t is the transit time of the ultrasound signal. By increasing $\Delta t$ the relative uncertainty of the measurement is decreased, however, by increasing t the uncertainty is drastically reduced, as t participates as squared. Therefore, the flow meter according to various embodiments has reduced uncertainty in the measurement of $v_{fluid}$, since both $\Delta t$ and t are increased.

Here, it should be noted that this invention is not bound by the above presented theoretical presentation, which is merely presented to illustrate the advantages of the invention.

Referring to FIG. 8, an embodiment of the invention is illustrated. Further to the above described embodiment, the present embodiment illustrates an ultrasonic flow meter 1 prior to assembly of said meter housing 2 with said flow tube 20. Here, it is can be seen that the first and second transducer recesses 15, 16, in which the first and second ultrasound transducers 6, 7 are positioned, can be inserted into a first and a second tube opening 21, 22 in the flow tube 20. In relation to the assembly of the ultrasonic flow meter 1, it can be seen on FIG. 8 that the flow channel insert 12 is positioned in a position such that the first and second tube opening 21, 22 in the flow tube 20 are positioned next to a first and a second insert opening 49, 50 in the flow channel insert 12. Thereby, the first and second transducer recess 6, 7 is, during assembly of the ultrasonic flow meter 1, inserted into the first and second tube openings 21, 22 in the flow tube 20 and into the first and second insert openings 49, 50. Thereby, the positions of the flow tube 20 and the flow channel insert 12 are fixated with respect to each other due to the engagement of the first and second transducer recesses 6, 7 into the first and second tube openings 21, 22 and the first and second insert openings 49, 50. This fixation is, however, dependent on the fixation of the meter housing 2 to the flow tube 20. This fixation may be facilitated e.g. by insertion of one or more locking pins 11 through engagement openings of the flow tube 20 and the meter housing 2. The setup of the present embodiment may advantageously reduce the pressure on the meter housing 2 from a fluid in the flow channel 5 since the size of the transducer recesses 15, 16 may be reduced due to the slanted positioning of the ultrasound transducers 6, 7, but this setup may also induce a problem of how to electrically connect the electrical circuit 4 with the transducers 6, 7. However, as is shown partly by the magnification, by means of a first elastic contacts 54, which are in contact with the upper surface 60 of the first transducer 6, and a metal layer contact 26, which are in contact with the emitting surface 61 of the first transducer 6, the first transducer 6 is put into electrical contact with the electrical circuit 4. Similarly, the second transducer 7 is put into contact with the electrical circuit 4 by means of the second elastic contact 55 and the metal layer contact 26. In the present embodiment, a common metal layer contact 26 is used. However, in alternative embodiments two separate contacts may be used.

Now, referring to FIG. 9, an embodiment of the invention is illustrated. In FIG. 9, the ultrasonic flow meter 1 is shown before assembly, i.e. the individual parts can be seen. The meter housing 2 of the ultrasonic flow meter 1 is assembled from a number of different parts. A meter housing body 57 has in the bottom a first and second transducer recess 15, 16. The first and second transducer recesses 15, 16 are each adapted to receive one of a first and second ultrasound transducer 6, 7. The first and second transducer recesses 15, 16 have slanted bottom walls 17, which results in the first and second ultrasound transducers 6, 7 to be orientated such that their respective ultrasound emitting or receiving surfaces are non-parallel to a longitudinal axis 19 of the flow channel 5 and non-orthogonal to longitudinal axes 18 of the transducer recesses 15, 16. The meter housing 2 also comprises an electronic circuit 4, which is in electrical contact with said first and second ultrasound transducers 6, 7 and with a battery 3. The electrical contacts between the electrical circuit 4 and the first and second ultrasound transducers 6, 7 are in this embodiment established as follows. A first and a second elastic contact 54, 55 is put into contact with, in one end, the first and second ultrasound transducers, respectively, and, in the other end, the electrical circuit 4. Furthermore, a metal layer contact 26 established electrical contact between the bottom sides of said first and second ultrasound transducers 6, 7 and the electrical circuit 4. According to the present embodiment, the electrical circuit 4 fixated in a first connection part 53, in which a battery 3 supplying electrical power to the electrical circuit 4 may also be fixated. The first connection part 53 is connected to a second connection part 54, which together with a third connection part 55 sandwich a part of the first and second elastic contacts 54, 55. The third connection part 55 may then be connection to the meter housing body 57. Finally, the meter housing comprises a display 23 for showing e.g. consumption data, such as e.g. the instantaneous consumption rate, the accumulated consumption since the last readout and/or the total lifetime accumulated consumption, or other data, such as meter identification number, production serial number etc. The display 23 is fixated to the meter housing body 57 by a display frame 14. The meter furthermore comprises a flow tube 20 defining a flow channel 5 as the hollow inner space of the flow tube 20. The flow tube 20 has a first tube end opening 47 in one end and a second tube end opening 48 in the opposite end. The fluid to be measured can then flow through the first tube opening 47, through the flow channel 5, and out through the second tube opening 48, or the opposite direction. Preferably, the flow tube 20 can be connected to existing piping system, thereby allowing the fluid to flow through the flow channel 5. The meter housing 2 can be connected to a fourth connection part 56 of said flow tube 20 by insertion of locking pins 11, which connects the bottom of the meter housing 2 with the fourth connection part of the flow tube 20. Finally, a flow channel insert 12, which may preferably be assembled from two mirror-symmetrical half-parts, may be inserted into the flow channel 5. The two half-parts may have insertion recesses for a first, second, and third ultrasound reflectors, so that when the two half-parts are assembled into the flow channel insert 12, the ultrasound reflectors are incorporated in this flow channel insert 12. The flow channel insert 12 may, prior to assembly of the meter housing 2 with the flow tube 20 by the locking pins 11, be inserted into the flow channel 5 in a position opposite or below the meter housing 2. The transducer recesses 15, 16 of the meter housing 2 may be inserted into tube openings 21, 22 in the flow tube 20, and into insert openings 49, 50, which are formed in the flow channel insert 12, when the two half-parts of this flow channel insert 12 are assembled. Thereby, the positions of the flow tube 20 and the flow channel insert 12 relative to the meter housing 2 is fixated, at least the position in a direction parallel to a longitudinal axis 19 of the flow tube 20. The position of the meter housing 2 is finally fixated to the flow tube 20 by means of two locking pins 11. These locking pins 11 engage locking pin openings 39, which are positioned in the meter housing 2 as well as in a fourth connection part 56 of the flow tube 2. According to the present embodiment, the ends of the two locking pins 11 are adapted to engage each other and lock together. By means of said locking pins 11, the meter housing 2 is fixated to the flow tube 2. Furthermore, the transducer recesses 15, 16 fixate the flow tube 20 to the flow channel insert 12. Thereby, the parts of the ultrasonic flow meter 1 are fixated to each other.

Now referring to FIG. 10, an embodiment of the invention is illustrated. A part of the ultrasonic flow meter 1 is shown, including the flow tube 20 defining a flow channel 5, a first and second transducer recess 15, 16, in which a first and second transducer 6, 7 is positioned, respectively. Furthermore, a flow channel insert 12, including a first, second, and a third ultrasound reflector 8, 9, 10, and guide elements 52, is shown. An ultrasound signal is emitted from the first ultrasound transducer 6 and reflected by the first, second, and third ultrasound reflectors 8, 9, 10 onto the second ultrasound transducer 7, where the ultrasound signal is detected and converted into an electrical signal. An ultrasound signal path 44 is shown from the first ultrasound transducer 6, via the ultrasound reflectors 8, 9, 10, and to the second ultrasound transducer 7. This ultrasound signal path 44 is of course to be understood as representing the directions of propagation of the ultrasound signal, but not as restricting the propagation of the ultrasound signal to the exact path line 44, since the actual path of course extends spatially around the path line 44. Also, a fluid flow line 62 is shown. This fluid flow line 62 illustrates the flow of the fluid medium through the flow channel 5. Here, the fluid flow line 62 is of course also to be understood as representing a direction of flow and not spatially restricting as the flow of course extends over the available inner of the flow tube 20. Since guide elements 52 extends into the flow channel 5 between the ultrasound reflectors 8, 9, 10, the fluid flow may be redirected or guided as illustrated by the fluid flow line 62. The actual extent of the effect of the guiding elements 52 may of course be very different than illustrated; typically the effect may be less significant. Also, it should be noted that the fluid flow line 62 is not left-right symmetric, but shifted towards the right of FIG. 10. This may be explained by the effect of the guide elements on the actual fluid flow being delayed or retarded. Due to change of fluid flow direction as induced by the guide elements 52, the interaction between the fluid and the ultrasound signal represented by path line 44 may be increased. This is due to the fact that the interaction between the flowing fluid and ultrasound signal is proportional to the path-integral between $$I \propto \int_S F(r) \cdot dr$$

where I is the interaction, F is a vector field representing the fluid flow, r is the spatial coordinate, and S defines the path of the ultrasound through the fluid between the two transducers 6, 7. Since an effect of the guide elements 52 on the fluid flow is that it is to a higher degree in the same direction as path of the ultrasound signal path 44, the dot-product F(r)·dr is increased, resulting in an increase in the interaction I. An increase in the interaction I may be advantageous since this caused the time difference Δt between the transit-time back and forth to increase, which again results in a more accurate measurement result of the fluid flow velocity.

Referring to FIG. 11A and FIG. 11B, an embodiment of the invention is illustrated. On FIG. 11A an ultrasonic flow meter 1 comprising a flow tube 20, a meter housing, and a flow channel insert 12, is shown. These are shown without details, but it is to be understood that any elements of the above described embodiments may be present in the present embodiment. The flow channel insert 12 is positioned in the flow channel 5 of the flow tube 12, so that first and second insert openings 49, 50 are positioned opposite first and second tube openings 21, 22, respectively. Then, during assembly, the first and second transducer recesses 15, 16 are inserted into the first and second tube openings 21, 22, and, furthermore, at least partly into the first and second insert openings 49, 50 of the flow channel insert 12. Thereby, the position of the flow channel insert 12 is fixated relative to the flow tube 5. However, to fixate the meter housing 2 to the flow tube 20, different methods may be used. In one embodiment, locking pins 11 may be inserted through openings 39 in a part of the flow tube 2 and into an opening in the meter housing 2, or vice versa. For instance, two locking pins 11 may be used by inserting them from opposite sides of the meter housing 2 and then connecting the two locking pins 11, e.g. by a ratchet-like connection. Furthermore, in an alternative embodiment, a protrusion of a locking pin may engage a recess of another locking pin, the meter housing 2, and/or the flow tube 20, or vice versa. Furthermore, in another alternative embodiment, a protrusion of a part of the meter housing, such as the transducer recess may engage a recess in the flow tube 20, such as in a tube opening 21, 22, or in the flow channel insert 12, such as in an insert opening 49, 50, or vice versa. When the meter housing is fixated to the flow tube 20 or to the flow channel insert 12, the flow tube 5, the meter housing 2 and the flow channel insert 12 are all three locked together or fixated, due to the flow tube 20 and the flow channel insert 12 being locked together upon insertion of the transducer recesses 15, 16 into the tube openings 21, 22.

Now, referring to FIG. 12, a cross-sectional view of a part of an ultrasonic flow meter 1 according to an embodiment of the invention is illustrated. The ultrasonic flow meter 1 comprises a flow tube 20 defining a flow channel 5 as an inner space, a meter housing 2, and a flow channel insert 12. The meter housing 2 comprises a first ultrasound transducer 6 in first transducer recess 15, and a second ultrasound transducer 7 in second transducer recess 16, both ultrasound transducers 6, 7 abutting the slanted bottom walls 17 of the respective transducer recesses 15, 16. The flow channel insert 12 comprises a first, a second, and a third ultrasound reflector 8, 9, 10. These ultrasound reflectors 8, 9, 10 are positioned and oriented so as to reflect an ultrasound signal from said first ultrasound transducer 6 to said second ultrasound transducer 7 and vice versa. As can be seen from FIG. 12, the slanted bottom walls 17 each have a focusing interface 63 between the meter housing 2 and the flow channel 5, here illustrated as a convex surface. The focusing effect may of course vary in different embodiments. Also, the focusing effect may in alternative embodiments be due to a focusing interface between the transducer and the slanted bottom wall, or as a combination of focusing interfaces. By focusing an emitted ultrasound signal, a greater part of this ultrasound signal may reach the receiving ultrasound transducer, thereby increasing the signal-to-noise ratio. Similarly, by focusing an ultrasound signal before the receiving transducer, the signal-to-noise ratio may be increased.

Referring to FIGS. 13A, 13B, and 13C, an embodiment of the invention is illustrated. Each of FIGS. 13A, 13B, and 13C illustrate a part of an ultrasonic flow meter, including a part of a meter housing 2, a flow tube 20 defining a flow channel 5, and one or more ultrasound reflectors 8, 9, 10. These ultrasound reflectors 8, 9, 10 reflect an ultrasound signal emitted from the first ultrasound transducer 6 onto the second ultrasound transducer 7. The path 44 of the ultrasound signal is illustrated. As can be seen from FIGS. 13A, 13B, and 13C, the same meter housing 2, including the same ultrasound transducers 6, 7 positioned and orientated identically in the meter housing 2, can be connected to a flow tube 20 of different diameter. However, the positions and/or orientations of the one or more ultrasound reflectors 8, 9, 10 can changed for different sizes or diameters of flow tubes 20. This illustrates an advantage of the invention in that the same meter housing 2 can be used for flow tubes 20 with different sizes or diameters. Furthermore, it is illustrated on FIG. 13C, only a signal ultrasound reflector 8 is shown, illustrating that this may be advantageous for larger sizes or diameters of flow tubes 20.

According to the present invention the embodiments mentioned in the specification of this patent application may be combined to obtain further embodiments according to the present invention.

LIST OF REFERENCE NUMERALS

1. Ultrasonic flow meter
2. Meter housing
3. Battery
4. Electronic control arrangement
5. Flow channel
6. First ultrasound transducer
7. Second ultrasound transducer
8. First ultrasound reflector
9. Second ultrasound reflector
10. Third ultrasound reflector
11. Locking pin
12. Flow channel insert
13. Glass
14. Fixation frame
15. First transducer recess
16. Second transducer recess
17. Slanted bottom wall
18. Transducer recess longitudinal axis
19. Flow channel longitudinal axis
20. Flow tube
21. First tube opening
22. Second tube opening
23. Display
25. Insulating support arrangement
26. Connection arrangement
27. First insulating part
28. Second insulating part
29. First connector
30. Second connector
31. Third connector
32. Set of connectors
33. First spring part
34. Second spring part
35. First contact 36. Second contact
37. Latch
38. Notch
39. Locking pin openings
40. Hole
41. Pin
42. Fastening part
43. Opening
44. Ultrasound path
45. Cutting line
46. Tube fixation arrangement
47. First tube end opening
48. Second tube end opening
49. First insert opening
50. Second insert opening
51. Metal layer contact
52. Guide element
53. First connection part
54. Second connection part
55. Third connection part
56. Fourth connection part
57. Meter housing body
58. Inserting said first and second transducer recesses
59. Inserting said pin
60. Upper surface
61. Emitting surface
62. Fluid flow line
63. Focusing interface
64. Reflective surface

What is claimed is:

1. An ultrasonic flow meter comprising
a meter housing;
a first ultrasound transducer;
a second ultrasound transducer;
an electronic control arrangement for operating the ultrasonic flow meter; and
a connection arrangement being arranged between the electronic control arrangement and at least one of the ultrasound transducers;
wherein the connection arrangement comprises:
an electrically insulating support arrangement; and
a set of elastic connectors for electrically connecting the electronic control arrangement with the at least one of the ultrasound transducers;
the insulating support arrangement mechanically fixating the set of elastic connectors and maintaining electrical separation between the set of elastic connectors;
wherein the first and second ultrasound transducers each comprises a first surface on a side towards the electronic control arrangement and a second surface on an opposite side; and
wherein the first and second ultrasound transducers each have a first contact and a second contact, the second contact having a first and a second part, the first contact extending over a part of the first surface, the first part of the second contact extending over a part of the second surface, and the second part of the second contact extending beyond the second surface and facing the electronic control arrangement.

2. The ultrasonic flow meter according to claim 1, wherein the set of elastic connectors comprises at least one first spring part for engaging the electronic control arrangement and at least one second spring part for engaging the at least one of the ultrasound transducers.

3. The ultrasonic flow meter according to claim 2, wherein the second spring part engages the first contact and another second spring part engages the second contact.

4. The ultrasonic flow meter according to claim 3, wherein each of the elastic connectors comprises a metal strip.

5. The ultrasonic flow meter according to claim 4, wherein the elastic connectors comprise a beryllium copper alloy, a phosphor bronze alloy, copper, a zinc alloy, nickel brass, brass, or a combination thereof.

6. The ultrasonic flow meter according to claim 2, wherein the spring parts comprise leaf springs.

7. The ultrasonic flow meter according to claim 1, wherein the insulating support arrangement is arranged at a distance from the electronic control arrangement.

8. The ultrasonic flow meter according to claim 1, wherein the electronic control arrangement applies a force on the connection arrangement in a direction towards the flow tube,
wherein the ultrasonic flow meter comprises a flow tube defining an inner flow channel for a fluid to be measured, and
wherein at least one of the first and second transducers applies a force on the connection arrangement in a direction away from the flow tube towards the electronic control arrangement.

9. The ultrasonic flow meter according to claim 1, wherein the insulating support arrangement comprises an insulating plastic material.

10. The ultrasonic flow meter according to claim 1, wherein the insulating support arrangement comprises first and second insulating parts.

11. The ultrasonic flow meter according to claim 1, wherein the second contacts are separate second contacts with each of the first and second ultrasound transducers.

12. The ultrasonic flow meter according to claim 1, wherein the connection arrangement is provided as a single, separate unit.

13. An ultrasonic flow meter comprising:
a meter housing;
an ultrasound transducer;
an electronic control arrangement for operating the ultrasonic flow meter; and
a connection arrangement being arranged between the electronic control arrangement and the ultrasound transducer;
wherein the connection arrangement comprises:
an electrically insulating support arrangement; and
a set of elastic connectors for electrically connecting the electronic control arrangement with the ultrasound transducer;
the insulating support arrangement mechanically fixating the set of elastic connectors and maintaining electrical separation between the set of elastic connectors;
wherein the ultrasound transducer comprises a first surface on a side towards the electronic control arrangement and a second surface on an opposite side; and
wherein the ultrasound transducer has a first contact and a second contact, the second contact having a first and a second part, the first contact extending over a part of the first surface, the first part of the second contact extending over a part of the second surface, and the second part of the second contact extending beyond the second surface and facing the electronic control arrangement.

14. The ultrasonic flow meter of claim 13, wherein the set of elastic connectors comprises at least first one spring part for engaging the electronic control arrangement and at least one second spring part for engaging the ultrasound transducer.

15. The ultrasonic flow meter of claim 14, wherein the at least one second spring part comprises a first and a second metal strip, and wherein the first metal strip engages the first contact and the second metal strip engages the second contact.

16. The ultrasonic flow meter of claim 15, wherein the at least one first spring part comprises a third and a fourth metal strip, and wherein the third and fourth metal strips engage the electronic control arrangement.

17. The ultrasonic flow meter according to claim 13, wherein the insulating support arrangement comprises an insulating plastic material.

18. A method for assembling an ultrasonic flow meter, the ultrasonic flow meter comprising:
   a meter housing;
   an ultrasound transducer;
   an electronic control arrangement for operating the ultrasonic flow meter; and
   a connection arrangement being arranged between the electronic control arrangement and the ultrasound transducer;
   wherein the connection arrangement comprises:
      an electrically insulating support arrangement; and
      a set of elastic connectors for electrically connecting the electronic control arrangement with the ultrasound transducer;
      the insulating support arrangement mechanically fixating the set of elastic connectors and maintaining electrical separation between the set of elastic connectors;
   wherein the ultrasound transducer comprises a first surface on a side towards the electronic control arrangement and a second surface on an opposite side;
   wherein the ultrasound transducer has a first contact and a second contact, the second contact having a first and a second part, the first contact extending over a part of the first surface, the first part of the second contact extending over a part of the second surface, and the second part of the second contact extending beyond the second surface and facing the electronic control arrangement; and
   wherein said method comprises the steps of:
      inserting the ultrasound transducer into the meter housing;
      inserting the connection arrangement into the meter housing so as to establish electrical contact to the transducer; and
      inserting the electronic control arrangement so as to establish electrical contact from the electronic control arrangement, through the connection arrangement, to the transducer.

19. The method according to claim 18, wherein the method further comprises a step of assembling the connection arrangement, comprising the steps of
   punching out of one or more metal sheets the set of elastic connectors; and
   fixating the set of elastic connectors in the insulating support arrangement.

20. The method according to claim 19, wherein at least two elastic connectors of the set of elastic connectors are punched out of a metal sheet as a single piece.

21. The method according to claim 19, wherein the step of assembling the connection arrangement further comprises the step of:
   bending first and second spring parts of the elastic connectors to allow engagement of the electronic control arrangement and the transducer.

22. The method according to claim 19, wherein the step of fixating the set of elastic connectors further comprises fixating the set of elastic connectors between a first and second insulating part.

23. The method according to claim 19, wherein the step of assembling the connection arrangement further comprises the step of:
   separating the set of elastic connectors to establish electrical insulation between the elastic connectors fixated in the insulating support arrangement.

24. The method according to claim 18, wherein the method further comprises the step of assembling the electronic control arrangement, comprising the step of:
   fixating a battery to at least one electrical circuit.

25. The method according to claim 18, wherein the method further comprises the steps of:
   connecting a display to the electronic control arrangement; and
   sealing the meter housing.

* * * * *